US012733028B2

(12) United States Patent
Liu et al.

(10) Patent No.: US 12,733,028 B2
(45) Date of Patent: Sep. 8, 2026

(54) DATA TRANSMISSION METHOD AND APPARATUS

(71) Applicant: Huawei Technologies Co., Ltd., Shenzhen (CN)

(72) Inventors: Hang Liu, Beijing (CN); Changqing Yang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 631 days.

(21) Appl. No.: 18/155,450

(22) Filed: Jan. 17, 2023

(65) Prior Publication Data

US 2023/0156770 A1 May 18, 2023

Related U.S. Application Data

(63) Continuation of application No. PCT/CN2020/102876, filed on Jul. 17, 2020.

(51) Int. Cl.
*H04W 72/11* (2023.01)
*H04B 17/309* (2015.01)
(Continued)

(52) U.S. Cl.
CPC ....... *H04W 72/543* (2023.01); *H04W 72/044* (2013.01)

(58) Field of Classification Search
CPC ... H04L 5/0094; H04L 1/1887; H04L 5/0005; H04W 28/065; H04W 72/1268;
(Continued)

(56) References Cited

U.S. PATENT DOCUMENTS 10,863,578 B2 * 12/2020 Jiang .................. H04W 28/065
2009/0232084 A1 * 9/2009 Li ........................ H04L 5/0064 370/352

(Continued)

FOREIGN PATENT DOCUMENTS

CN 108604948 A 9/2018
CN 109219131 A 1/2019

(Continued)

OTHER PUBLICATIONS

Samsung, "Analysis of Skipping Segmentation", 3GPP TSG-RAN WG2 Meeting #99bis R2-1711790, Prague, Czech Republic, Oct. 9-13, 2017, 3 pages.

(Continued)

*Primary Examiner* — Marcus Smith
*Assistant Examiner* — Jason A Harley
(74) *Attorney, Agent, or Firm* — Conley Rose, P.C.

(57) ABSTRACT

A data transmission method includes a second node receiving first configuration information from a first node. The first configuration information is used to configure a first time-frequency resource. The data transmission method further includes the second node obtaining first information corresponding to a first logical channel, where the first information is used to indicate whether segmentation of a data packet on the first logical channel is allowed, the first logical channel corresponds to a second time-frequency resource, and the second time-frequency resource is included in the first time-frequency resource. The data transmission method further includes the second node sending first data to the first node using the first time-frequency resource.

20 Claims, 7 Drawing Sheets

(51) Int. Cl.

| | |
|---|---|
| ***H04L 5/00*** | (2006.01) |
| ***H04L 43/0882*** | (2022.01) |
| ***H04W 24/10*** | (2009.01) |
| ***H04W 72/04*** | (2023.01) |
| ***H04W 72/044*** | (2023.01) |
| ***H04W 72/40*** | (2023.01) |
| ***H04W 72/543*** | (2023.01) |
| ***H04W 76/15*** | (2018.01) |

(58) Field of Classification Search

CPC ... H04W 72/23; H04W 72/02; H04W 72/231; H04W 80/02; H04W 72/11; H04W 72/40; H04B 17/24; H04B 17/309

USPC .......................................................... 370/330

See application file for complete search history.

(56) References Cited

U.S. PATENT DOCUMENTS

| | | | | |
|---|---|---|---|---|
| 2017/0150393 | A1* | 5/2017 | Payer | H04W 28/0268 |
| 2017/0222871 | A1* | 8/2017 | Yu | H04L 1/0083 |
| 2018/0213550 | A1 | 7/2018 | Li et al. | |
| 2019/0215901 | A1* | 7/2019 | Jiang | H04W 80/08 |
| 2019/0306871 | A1 | 10/2019 | Liu et al. | |
| 2019/0313375 | A1* | 10/2019 | Loehr | H04W 72/04 |
| 2020/0137738 | A1 | 4/2020 | Liu et al. | |
| 2021/0092637 | A1 | 3/2021 | Tang | |
| 2022/0279609 | A1* | 9/2022 | Wu | H04W 76/14 |
| 2023/0038071 | A1* | 2/2023 | Shen | H04W 72/02 |
| 2023/0144979 | A1* | 5/2023 | Niu | H04W 24/10 370/329 |
| 2023/0155738 | A1* | 5/2023 | Zhang | H04L 1/1812 370/329 |

FOREIGN PATENT DOCUMENTS

| | | | |
|---|---|---|---|
| CN | 111212398 | A | 5/2020 |
| JP | 2019533958 | A | 11/2019 |
| WO | 2017049536 | A1 | 3/2017 |
| WO | 2017202334 | A1 | 11/2017 |
| WO | 2018068704 | A1 | 4/2018 |
| WO | 2019185014 | A1 | 10/2019 |

OTHER PUBLICATIONS

Samsung, “Analysis of Skipping Segmentation”, 3GPP TSG-RAN WG2 Meeting #99 R2-1709034, Berlin, Germany, Aug. 21-25, 2017, 3 pages.

3GPP TS 36.321 V14.12.0, Dec. 2019, 3rd Generation Partnership Project; Technical Specification Group Radio Access Network; Evolved Universal Terrestrial Radio Access (E-UTRA); Medium Access Control (MAC) protocol specification (Release 14), 110 pages.

R2-1801960, ZTE Corporation, Discussion on mode 3 resource allocation in PC5 CA, 3GPP TSG-RAN WG2 Meeting #101, Athens, Greece, Feb. 26-Mar. 2, 2018, 5 pages.

* cited by examiner

DATA TRANSMISSION METHOD AND APPARATUS

CROSS-REFERENCE TO RELATED APPLICATIONS

This is a continuation of International Patent Application No. PCT/CN2020/102876 filed on Jul. 17, 2020, the disclosure of which is hereby incorporated by reference in its entirety.

TECHNICAL FIELD

Embodiments of this application relate to the field of communications technologies, and in particular, to a data transmission method and an apparatus.

BACKGROUND

With continuous development of global communications technologies, a development speed and application of wireless communications technologies have surpassed those of fixed communications technologies, showing a trend of development in full swing. Intelligent terminals such as an intelligent transportation device, a smart home device, and a robot are gradually entering people's daily life.

For example, the intelligent terminal is the intelligent transportation device. Development and application of the internet of vehicles technology are increasingly concerned by people. Compared with existing wired communication, vehicle-mounted wireless communication can further reduce a quantity of harnesses and length and weight of the harnesses in a vehicle, and corresponding installation, upkeep, and maintenance costs. Therefore, a vehicle-mounted communications technology is gradually wireless. With diversification of vehicle-mounted applications, a quantity of vehicle-mounted communications nodes and types of the vehicle-mounted communications nodes are increasing, which imposes a higher requirement on a capability of vehicle-mounted communication.

For the intelligent transportation device, with continuous development of an intelligent cockpit technology, a vehicle is not only a means of transportation, but also one of people's living spaces. An intelligent cockpit is expected to provide richer entertainment and office experience.

Currently, devices in the intelligent cockpit mainly include a cockpit domain controller (CDC) and a terminal device. The terminal device includes vehicle-mounted terminal devices such as a vehicle-mounted display, a vehicle-mounted speaker, and a vehicle-mounted microphone, and further includes a non-vehicle-mounted terminal device such as an intelligent terminal. Usually, the cockpit domain controller and the terminal device are connected in a wired manner to implement mutual data transmission. However, the wired connection manner is limited by factors such as cable costs and in-vehicle cable layout. Therefore, in an increasing quantity of solutions, the cockpit domain controller and the terminal device are connected in a wireless manner, so that the cockpit domain controller and the terminal device transmit data based on the established wireless connection.

In a process in which the cockpit domain controller and the terminal device transmit data based on the wireless connection, a size of a time-frequency resource used to carry the data may not match a size of an upper-layer data packet that needs to be transmitted. In this case, the data packet needs to be segmented, and additional header information, for example, segmentation offset information, needs to be added to segmented data, so that a receive end can concatenate the segmented data based on the header information to obtain a complete data packet.

However, when a transmitted data packet is a small packet with a small data volume, if the data packet is transmitted in segments and additional information is added, a proportion of effective load in a time-frequency resource is severely affected. Consequently, system overheads are greatly increased, and a processing latency is also increased because data is segmented at a transmit end and segmented data is concatenated at the receive end.

SUMMARY

This application provides a data transmission method and an apparatus, to improve transmission efficiency and reduce system overheads and a latency.

According to a first aspect, this application provides a data transmission method. The method may be applied to a communications system. The communications system may include a plurality of transmission nodes, and data transmission may be performed between the plurality of transmission nodes. For example, in the communications system, a second node sends data to a first node. The method includes: The second node receives first configuration information from the first node. The first configuration information is used to configure a first time-frequency resource. The second node obtains first information corresponding to a first logical channel, where the first information is used to indicate whether segmentation of a data packet on the first logical channel is allowed, the first logical channel corresponds to a second time-frequency resource, and the second time-frequency resource is included in the first time-frequency resource. The second node sends first data to the first node by using the first time-frequency resource.

Therefore, based on the foregoing method, when the data packet on the first logical channel is sent, whether segmentation of the data packet on the first logical channel is allowed may be controlled. Further, when the first logical channel is used to transmit a small packet, the first information may be used to indicate that segmentation of the data on the first logical channel is not allowed, so as to avoid segmentation of the small packet, increase a proportion of effective load in a time-frequency resource, and reduce system overheads and a latency.

In a possible design, when the data packet on the first logical channel needs to be transmitted, whether the data packet on the first logical channel can be sent by using the second time-frequency resource corresponding to the first logical channel is affected by content indicated by the first information. For example, if the first information is used to indicate that segmentation of the data packet on the first logical channel is not allowed, the data packet on the first logical channel is segmented when the data packet on the first logical channel is sent by using the second time-frequency resource. In this case, the data packet on the first logical channel cannot be sent by using the second time-frequency resource. In addition, whether the data packet on the first logical channel can be sent by using the second time-frequency resource corresponding to the first logical channel is further affected by a size of the second time-frequency resource.

Therefore, in the method, whether the data packet on the first logical channel is sent by using the second time-frequency resource may be specifically determined based on at least one of the first information and the second time-frequency resource.

In a possible design, in the foregoing method, the first data includes no data packet on the first logical channel.

The first information is used to indicate that segmentation of the data packet on the first logical channel is not allowed, and a size of the second time-frequency resource is insufficient to carry all data packets on the first logical channel.

In other words, in the foregoing design, if the first information is used to indicate that segmentation of the data packet on the first logical channel is not allowed and the size of the second time-frequency resource is insufficient to carry all the data packets on the first logical channel, the first data includes no data packet on the first logical channel. In this way, segmentation of the data packet on the first logical channel can be avoided. For example, in a specific implementation process of the method provided in this application, when the first information indicates that segmentation of the data packet on the first logical channel is not allowed, segmentation of the data packet on the first logical channel can be avoided in a manner that whether the size of the second time-frequency resource is sufficient to carry all the data packets on the first logical channel is determined, and if it is determined that the size of the second time-frequency resource is insufficient to carry all the data packets on the first logical channel, the data packet on the first logical channel is not sent by using the second time-frequency resource (the first data includes no data packet on the first logical channel).

Alternatively, the first information is used to indicate that segmentation of the data packet on the first logical channel is not allowed, and a size of the second time-frequency resource is insufficient to carry any data packet or the 1$^{st}$ data packet on the first logical channel.

In other words, in the foregoing design, if the first information is used to indicate that segmentation of the data packet on the first logical channel is not allowed and the size of the second time-frequency resource is insufficient to carry any data packet or the 1$^{st}$ data packet on the first logical channel, the first data includes no data packet on the first logical channel. In this way, segmentation of the data packet on the first logical channel can be avoided. For example, in a specific implementation process of the method provided in this application, when the first information indicates that segmentation of the data packet on the first logical channel is not allowed, segmentation of the data packet on the first logical channel can be avoided in a manner that whether the size of the second time-frequency resource is sufficient to carry any data packet on the first logical channel is determined, and if it is determined that the size of the second time-frequency resource is insufficient to carry any data packet on the first logical channel, the data packet on the first logical channel is not sent by using the second time-frequency resource. Alternatively, when the data packet on the first logical channel corresponds to a sending sequence, segmentation of the data packet on the first logical channel can be avoided in a manner that whether the size of the second time-frequency resource is sufficient to carry the 1$^{st}$ data packet on the first logical channel is determined, and if it is determined that the size of the second time-frequency resource is insufficient to carry the 1$^{st}$ data packet on the first logical channel, the data packet on the first logical channel is not sent by using the second time-frequency resource.

In a possible design, in the foregoing method, the first data includes at least one data packet on the first logical channel. That the second node sends first data to the first node by using the first time-frequency resource includes: sending the at least one data packet on the first logical channel to the first node based on at least one of the first information or a size the second time-frequency resource by using the second time-frequency resource. In other words, in a specific implementation process of the method provided in this application, it may be determined, based on the first information and/or the size of the second time-frequency resource, whether to send the at least one data packet on the first logical channel to the first node by using the second time-frequency resource, that is, whether the first data includes the at least one data packet on the first logical channel.

In a possible design, in the foregoing method, the first data includes all data packets on the first logical channel. The size of the second time-frequency resource is sufficient to carry all the data packets on the first logical channel. To be specific, after it is determined that the size of the second time-frequency resource is sufficient to carry all the data packets on the first logical channel, the first data may include all the data packets on the first logical channel without considering content indicated by the first information, to send the data packet on the first logical channel. For example, all the data packets on the first logical channel may be carried in the second time-frequency resource for sending.

In the foregoing design, when the size of the second time-frequency resource is sufficient to carry all the data packets on the first logical channel, regardless of whether the first information indicates that segmentation of the data packet on the first logical channel is not allowed or indicates that segmentation of the data packet on the first logical channel is allowed, all the data packets on the first logical channel are carried in the second time-frequency resource and sent to the first node in a manner of skipping segmenting the data packet on the first logical channel. Therefore, based on the foregoing design, when the size of the second time-frequency resource is sufficient to carry all the data packets on the first logical channel, a processing process of the second node may be simplified, that is, all the data packets on the first logical channel may be sent without processing the first information.

In a possible design, in the foregoing method, the first data includes the at least one data packet on the first logical channel. The first information is used to indicate that segmentation of the data packet on the first logical channel is not allowed, and the size of the second time-frequency resource is insufficient to carry all data packets on the first logical channel but is sufficient to carry the at least one data packet. In other words, when the first information is used to indicate that segmentation of the data packet on the first logical channel is not allowed, if the size of the second time-frequency resource is insufficient to carry all the data packets on the first logical channel, but the size of the second time-frequency resource is sufficient to carry the at least one data packet on the first logical channel, the data may be transmitted in a manner in which the first data includes the at least one data packet on the first logical channel.

In a possible design, in the foregoing method, the first logical channel corresponds to a first data queue, and the data packet on the first logical channel includes a service data packet, or the data packet on the first logical channel includes control signaling. Based on the foregoing design, when the data packet on the first logical channel refers to the service data packet, the first information is used to indicate that segmentation of the data packet on the first logical channel is not allowed, to ensure that the service data packet on the first logical channel is not segmented in a transmission process. Alternatively, when the data packet on the first logical channel refers to the control signaling, the first information is used to indicate that segmentation of the data packet on the first logical channel is not allowed, to ensure that the control signaling is not segmented in a transmission process.

In a possible design, the first logical channel corresponds to a first protocol stack entity, and the data packet on the first logical channel is a service data unit SDU in the first protocol stack entity. Based on the foregoing design, the first information may be used to indicate whether segmentation of the service data unit in the first protocol stack entity is allowed.

In a possible design, in the foregoing method, that the second node obtains first information corresponding to a first logical channel includes: receiving second configuration information from the first node, where the second configuration information is used to configure the first information corresponding to the first logical channel. Based on the foregoing design, the first node may control whether segmentation of the data packet on the first logical channel is allowed.

In a possible design, in the foregoing method, that the second node obtains first information corresponding to a first logical channel includes: determining, based on quality of service QoS information or a service type corresponding to data on the first logical channel, the first information corresponding to the first logical channel. Based on the foregoing design, a manner of sending the data packet on the first logical channel may match quality of service QoS information or a service type corresponding to the first logical channel.

In a possible design, in the foregoing method, the first data includes at least one data packet on a second logical channel. Based on the foregoing design, data packets of a plurality of logical channels may be carried in the first data.

In a possible design, in the foregoing method, a priority of the second logical channel is lower than a priority of the first logical channel. Based on the foregoing design, data packets of a plurality of logical channels with different priorities may be carried in the first data.

According to a second aspect, this application provides a data transmission method. The method includes: A first node sends first configuration information and second configuration information to a second node. The first configuration information is used to configure a first time-frequency resource, and the second configuration information is used to indicate whether segmentation of a data packet on a first logical channel is allowed. The first logical channel corresponds to a second time-frequency resource, and the second time-frequency resource is included in the first time-frequency resource. The first node receives first data from the second node by using the first time-frequency resource.

Therefore, based on the foregoing method, when the second node sends the data packet on the first logical channel, whether segmentation of the data packet on the first logical channel is allowed may be controlled. Further, when the first logical channel is used to transmit a small packet, the first information may be used to indicate that segmentation of the data packet on the first logical channel is not allowed, so as to avoid segmentation of the small packet, increase a proportion of effective load in a time-frequency resource, and reduce system overheads.

In a possible design, in the foregoing method, the first logical channel corresponds to a first data queue, and the data packet on the first logical channel includes a service data packet, or the data packet on the first logical channel includes control signaling. Based on the foregoing design, when the data packet on the first logical channel refers to the service data packet, the first information is used to indicate that segmentation of the data packet on the first logical channel is not allowed, to ensure that the service data packet on the first logical channel is not segmented in a transmission process. Alternatively, when the data packet on the first logical channel refers to the control signaling, the first information is used to indicate that segmentation of the data packet on the first logical channel is not allowed, to ensure that the control signaling is not segmented in a transmission process.

In a possible design, the first logical channel corresponds to a first protocol stack entity, and the data packet on the first logical channel is a service data unit SDU in the first protocol stack entity. Based on the foregoing design, the first information may be used to indicate whether segmentation of the service data unit in the first protocol stack entity is allowed.

In a possible design, in the foregoing method, the first data includes at least one data packet on a second logical channel. Based on the foregoing design, data packets of a plurality of logical channels may be carried in the first data.

In a possible design, in the foregoing method, a priority of the second logical channel is lower than a priority of the first logical channel. Based on the foregoing design, data packets of a plurality of logical channels with different priorities may be carried in the first data.

According to a third aspect, this application provides a communication method. The method includes: A second node receives a first system broadcast message from a first node. The first system broadcast message includes identity information of the first node. After determining that the identity information of the first node is consistent with preset identity information, the second node sends an access request to the first node. In the foregoing method, before sending the access request to the first node, the second node first authenticates the identity information of the first node, and sends the access request to the first node after authentication succeeds. In this way, the second node is prevented from sending the access request to an incorrect node. For example, when the second node is a vehicle-mounted or non-vehicle-mounted device in a cockpit domain and the first node is a CDC, the second node may be prevented from establishing a connection to a CDC on another external vehicle.

In a possible design, the identity information of the first node may be at least one of a device identifier, a media access control (MAC) address, a soft address, and a short address of the first node.

According to a fourth aspect, this application provides a communication method. The method includes: A first node sends a first system broadcast message to a second node. The first system broadcast message includes identity information of the first node. The first node receives an access request from the second node.

In a possible design, the identity information of the first node may be at least one of a device identifier, a MAC address, a soft address, and a short address of the first node.

According to a fifth aspect, this application provides a communication method. The method includes: A second node receives access resource configuration information from a first node. The access resource configuration information is used to configure an access resource used to establish a connection (also referred to as access) to the first node. The second node sends an access request to the first node on the configured access resource.

In a possible design, the access resource configuration information further includes information about an access manner corresponding to the access resource, or the access resource configuration information is further used to indicate an access manner corresponding to the access resource.

In a possible design, the access resource configuration information may be system information or RRC signaling.

In a possible design, when the access manner is contention-based access, the second node randomly selects a first resource from the access resource, and sends the access request to the first node on the first resource.

In a possible design, that the second node sends the access request to the first node on the first resource may include: sending the access request to the first node, and sending second identity information of the second node to the first node on the first resource.

In a possible design, when the access manner is non-contention-based access, the second node determines a second resource from the access resource based on the second identity information of the second node, and sends the access request to the first node on the second resource.

In a possible design, that the second node sends the access request to the first node on the second resource may include: sending third identity information of the second node to the first node on the second resource.

In a possible design, the second identity information and the third identity information may be the same or different. The second identity information or the third identity information may be at least one of a device identifier, a MAC address, a soft address, and a short address.

According to a sixth aspect, this application provides a communication method. The method includes: A first node sends access resource configuration information to a second node. The access resource configuration information is used to configure an access resource used to establish a connection (also referred to as access) to the first node. The first node receives an access request from the second node by using the access resource.

In a possible design, the access resource configuration information further includes information about an access manner corresponding to the access resource, or the access resource configuration information is further used to indicate an access manner corresponding to the access resource.

In a possible design, the access resource configuration information may be system information (system information) or RRC signaling.

According to a seventh aspect, this application provides a data transmission apparatus. The data transmission apparatus may be a chip or a system on a chip. The data transmission apparatus may implement a function implemented in the foregoing first aspect or the possible design of the first aspect. The function may be implemented by hardware, or may be implemented by hardware by executing corresponding software. The hardware or the software includes one or more modules corresponding to the foregoing function. For example, the data transmission apparatus may include: a receiving unit, configured to receive first configuration information from a first node, where the first configuration information is used to configure a first time-frequency resource; an obtaining unit, configured to obtain first information corresponding to a first logical channel, where the first information is used to indicate whether segmentation of a data packet on the first logical channel is allowed, the first logical channel corresponds to a second time-frequency resource, and the second time-frequency resource is included in the first time-frequency resource; and a sending unit, configured to send first data to the first node by using the first time-frequency resource. Certainly, the data transmission apparatus may further include more or fewer units, configured to implement another function of a terminal device.

According to an eighth aspect, this application provides a data transmission apparatus. The data transmission apparatus may be a chip or a system on a chip. The data transmission apparatus may implement a function implemented in the foregoing second aspect or the possible design of the second aspect. The function may be implemented by hardware, or may be implemented by hardware by executing corresponding software. The hardware or the software includes one or more modules corresponding to the foregoing function. For example, the data transmission apparatus may include a sending unit and a receiving unit. The sending unit is configured to send first configuration information to a second node, where the configuration information is used to configure a first time-frequency resource. The sending unit is further configured to send second configuration information, where the second configuration information is used to indicate whether segmentation of a data packet on a first logical channel is allowed, the first logical channel corresponds to a second time-frequency resource, and the second time-frequency resource is included in the first time-frequency resource. The receiving unit is configured to receive first data from the second node by using the first time-frequency resource. Certainly, the data transmission apparatus may further include more or fewer units, configured to implement another function of a terminal device.

According to a ninth aspect, this application provides a data transmission apparatus. The data transmission apparatus may be a chip or a system on a chip. The data transmission apparatus may implement a function implemented in the foregoing third aspect or the possible design of the third aspect. The function may be implemented by hardware, or may be implemented by hardware by executing corresponding software. The hardware or the software includes one or more modules corresponding to the foregoing function. For example, the data transmission apparatus may include: a receiving unit, configured to receive a first system broadcast message from a first node, where the first system broadcast message includes identity information of the first node; and a sending unit, configured to send an access request to the first node after determining that the identity information of the first node is consistent with preset identity information. Certainly, the data transmission apparatus may further include more or fewer units, configured to implement another function of a terminal device.

According to a tenth aspect, this application provides a data transmission apparatus. The data transmission apparatus may be a chip or a system on a chip. The data transmission apparatus may implement a function implemented in the foregoing fourth aspect or the possible design of the fourth aspect. The function may be implemented by hardware, or may be implemented by hardware by executing corresponding software. The hardware or the software includes one or more modules corresponding to the foregoing function. For example, the data transmission apparatus may include: a sending unit, configured to send a first system broadcast message to a second node, where the first system broadcast message includes identity information of a first node; and a receiving unit, configured to receive an access request from the second node. Certainly, the data transmission apparatus may further include more or fewer units, configured to implement another function of a terminal device.

According to an eleventh aspect, this application provides a data transmission apparatus. The data transmission apparatus may be a chip or a system on a chip. The data transmission apparatus may implement a function implemented in the foregoing fifth aspect or the possible design of the fifth aspect. The function may be implemented by hardware, or may be implemented by hardware by executing corresponding software. The hardware or the software includes one or more modules corresponding to the foregoing function. For example, the data transmission apparatus may include: a receiving unit, configured to receive access resource configuration information from a first node, where the access resource configuration information is used to configure an access resource used to establish a connection (also referred to as access) to the first node; and a sending unit, configured to send, by a second node, an access request to the first node on the configured access resource. Certainly, the data transmission apparatus may further include more or fewer units, configured to implement another function of a terminal device.

According to a twelfth aspect, this application provides a data transmission apparatus. The data transmission apparatus may be a chip or a system on a chip. The data transmission apparatus may implement a function implemented in the foregoing third aspect or the possible design of the third aspect. The function may be implemented by hardware, or may be implemented by hardware by executing corresponding software. The hardware or the software includes one or more modules corresponding to the foregoing function. For example, the data transmission apparatus may include: a sending unit, configured to send access resource configuration information to a second node, where the access resource configuration information is used to configure an access resource used to establish a connection (also referred to as access) to a first node; and a receiving unit, configured to receive, by the first node, an access request from the second node by using the access resource. Certainly, the data transmission apparatus may further include more or fewer units, configured to implement another function of a terminal device.

According to a thirteenth aspect, this application provides a data transmission apparatus. The data transmission apparatus includes one or more processors. The one or more processors are coupled to one or more memories. The one or more memories store computer instructions. When the one or more processors execute the computer instructions, the data transmission apparatus performs the data transmission method performed by the second node in the foregoing first aspect or the possible design of the first aspect. Alternatively, when the one or more processors execute the computer instructions, the data transmission apparatus performs the data transmission method performed by the first node in the foregoing second aspect or the possible design of the second aspect. Alternatively, when the one or more processors execute the computer instructions, the data transmission apparatus performs the communication method performed by the second node in the foregoing third aspect or the possible design of the third aspect. When the one or more processors execute the computer instructions, the data transmission apparatus performs the communication method performed by the first node in the foregoing fourth aspect or the possible design of the fourth aspect. When the one or more processors execute the computer instructions, the data transmission apparatus performs the communication method performed by the second node in the foregoing fifth aspect or the possible design of the fifth aspect. When the one or more processors execute the computer instructions, the data transmission apparatus performs the communication method performed by the first node in the foregoing sixth aspect or the possible design of the sixth aspect.

According to a fourteenth aspect, this application provides a computer-readable storage medium. The computer-readable storage medium stores an instruction. When the instruction is run, the data transmission method performed by the second node in the foregoing first aspect or the possible design of the first aspect is performed. Alternatively, when the instruction is run, the data transmission method performed by the first node in the foregoing second aspect or the possible design of the second aspect is performed. Alternatively, when the instruction is run, the communication method performed by the second node in the foregoing third aspect or the possible design of the third aspect is performed. Alternatively, when the instruction is run, the data transmission method performed by the first node in the foregoing fourth aspect or the possible design of the fourth aspect is performed. Alternatively, when the instruction is run, the data transmission method performed by the second node in the foregoing fifth aspect or the possible design of the fifth aspect is performed. Alternatively, when the instruction is run, the communication method performed by the first node in the foregoing sixth aspect or the possible design of the sixth aspect is performed.

According to a fifteenth aspect, this application provides a computer program product including an instruction. When the computer program product runs on a computer, the computer can perform the data transmission method performed by the second node in the foregoing first aspect or the possible design of the first aspect, or the computer can perform the data transmission method performed by the first node in the foregoing second aspect or the possible design of the second aspect, or the computer can perform the communication method performed by the second node in the foregoing third aspect or the possible design of the third aspect, or the computer can perform the data transmission method performed by the first node in the foregoing fourth aspect or the possible design of the fourth aspect, or the computer can perform the data transmission method performed by the second node in the foregoing fifth aspect or the possible design of the fifth aspect, or the computer can perform the communication method performed by the first node in the foregoing sixth aspect or the possible design of the sixth aspect.

According to a sixteenth aspect, this application provides a chip. The chip includes a processing circuit and an interface. The processing circuit is configured to invoke, from a storage medium, a computer program stored in the storage medium and run the computer program, to perform the data transmission method according to the foregoing first aspect or the possible design of the first aspect, or perform the data transmission method according to the foregoing the second aspect or the possible design of the second aspect, or perform the communication method performed by the second node in the foregoing third aspect or the possible design of the third aspect, or perform the data transmission method performed by the first node in the foregoing fourth aspect or the possible design of the fourth aspect, perform the data transmission method performed by the second node in the foregoing fifth aspect or the possible design of the fifth aspect, or perform the communication method performed by the first node in the foregoing sixth aspect or the possible design of the sixth aspect.

According to a seventeenth aspect, this application provides a data transmission system. The data transmission system includes two or more data transmission apparatuses provided according to the foregoing seventh aspect to the twelfth aspect.

According to an eighteenth aspect, this application protects a cockpit system. The cockpit system includes the data transmission apparatus according to the foregoing seventh aspect or the ninth aspect, and/or the data transmission apparatus according to the foregoing eighth aspect or the tenth aspect.

According to a nineteenth aspect, this application protects a terminal. The terminal may be a means of transportation or an intelligent device, including an uncrewed aerial vehicle, an uncrewed carrier vehicle, an intelligent automobile, a robot, or the like. The terminal includes the cockpit system.

For example, any design manner in the seventh aspect to the nineteenth aspect may correspond to the foregoing first aspect to the sixth aspect. Therefore, a similar technical effect can be brought. Details are not described herein again.

DESCRIPTION OF EMBODIMENTS

Figure 1:
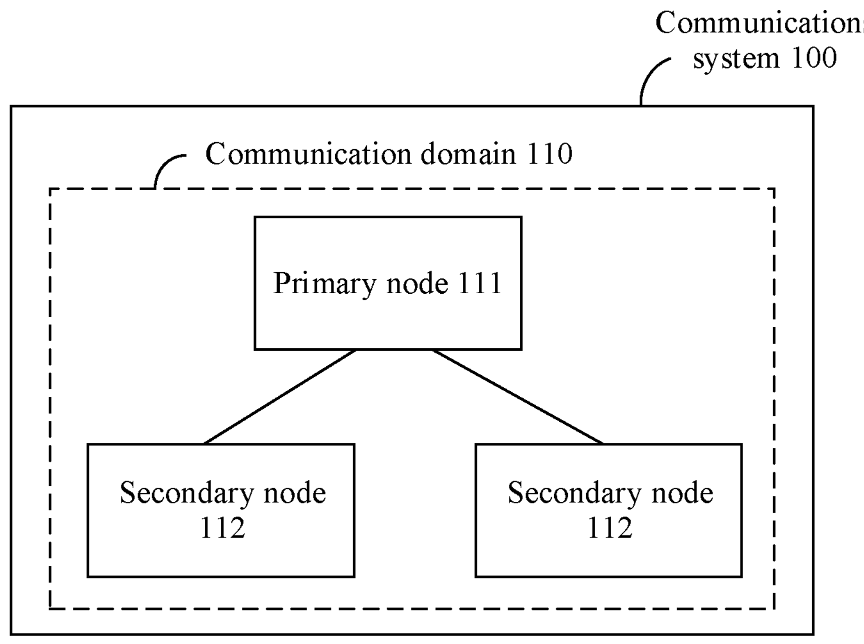
FIG. 1 is a schematic diagram of a structure of a communications system according to an embodiment of this application.

The following describes technical solutions of this application with reference to accompanying drawings. To clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity and an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a related concept in a specific manner for ease of understanding.

Some concepts related to a data transmission method and apparatus provided in embodiments of this application are described.

Logical channel: Generally, different services have different quality of service (QoS) requirements. Therefore, different logical channels can be established for different services, to ensure differentiated QoS requirements of different services. For example, different logical channels are respectively established for an audio service and a video service. Certainly, it may be understood that a same logical channel may also be established for one or more services with similar QoS requirements, to reduce a quantity of logical channels and facilitate management.

It should be noted that a logical channel is an abstract concept, and data on each of different logical channels corresponds to one or more types of service data on the logical channel. Optionally, the service data may be a service data packet, or a service data packet queue.

More broadly, logical channels are distinguished based on attributes of transmitted content. For example, there may be two types of logical channels: a control channel and a traffic channel. The control channel is used to transmit control plane information, and the traffic channel is used to transmit user plane information (for example, service data). For example, the control channel may be further classified into a common control channel and a dedicated control channel.

Optionally, in a specific protocol stack, one logical channel may correspond to one or more protocol entities. A Long-Term Evolution (LTE) system is used as an example. A single logical channel corresponds to a single radio link control (RLC) entity. A user plane protocol stack of the LTE system includes a Packet Data Convergence Protocol (PDCP) layer, an RLC layer, a MAC layer, and a physical (PHY) layer.

For example, a data packet at a network layer is referred to as a service data packet in the present disclosure, for example, an Internet Protocol (IP) data packet transferred from the network layer, and the data packet is transferred to a PDCP entity. In the PDCP entity, the IP data packet is considered as a service data unit (SDU) of the PDCP layer, the PDCP entity processes the IP data packet, for example, adds header information of the PDCP layer to the data packet, and data obtained after the processing is referred to as a PDCP protocol data unit (PDU). Likewise, the PDCP PDU is transferred to the RLC layer by using an inter-layer service access point (SAP), and the PDCP PDU is considered as an SDU of the RLC layer. The SDU of the RLC layer is processed at the RLC layer, for example, added with a header of the RLC layer, to generate an RLC PDU. It may be understood that, at a receive end, a peer protocol layer parses a packet header of the data packet, for example, removes the packet header, to obtain the SDU.

It may be understood that, for a protocol layer, the protocol layer may not process an SDU, that is, a generated PDU includes the SDU, a size of the PDU is equal to that of the SDU, and the generated PDU does not include any packet header information. To be specific, it may be understood as transparent transmission, which may be referred to as transparency for short.

It should be noted that, the present disclosure does not limit composition of the specific protocol stack, because a specific protocol entity corresponding to the logical channel is not limited either. For example, in the present disclosure, a logical channel may correspond to an RLC entity, data on the logical channel corresponds to an SDU at an RLC layer, and that the data on the logical channel is not segmented means that an RLC SDU is not segmented. Alternatively, in the present disclosure, a logical channel may correspond to a PDCP entity, data on the logical channel corresponds to an SDU at a PDCP layer, and that the data on the logical channel is not segmented means that a PDCP SDU is not segmented. Certainly, it may be understood that the protocol stack may also include another layer, and names may also be completely different. This is not limited in the present disclosure.

FIG. 1 is a schematic diagram of a structure of a communications system 100 according to an embodiment of this application. The communications system 100 includes at least one communication domain. FIG. 1 shows a communication domain 110. The communication domain 110 includes a primary node 111 and at least one secondary node 112. As shown in FIG. 1, two secondary nodes 112 are included.

It should be noted that the primary node 111 in this embodiment of this application refers to an apparatus that can communicate with the secondary node 112 and has a capability of managing the secondary node 112 (for example, scheduling a resource for the secondary node 112).

It should be further noted that the secondary node 112 in this embodiment of this application refers to an apparatus that can follow management of the primary node 111 and has a capability of performing communication by using a resource allocated by the primary node 111.

The communication domain 110 may be applied to a plurality of environments. This is not limited in this embodiment of this application.

In a possible implementation, the communication domain 110 may be applied to a cockpit (also referred to as a cabin) environment of a motor vehicle (for example, a smart vehicle, an electric vehicle, or a digital vehicle) and the like.

In another possible implementation, the communication domain 110 may be applied to a smart home environment.

Optionally, the primary node 111 may communicate with the secondary node 112 in a plurality of manners. This is not limited in this embodiment of this application. For example, the primary node 111 may communicate with the secondary node 112 in a wireless manner.

It should be noted that the wireless manner may implement communication by using a communications network. The communications network may be a local area network, or may be a wide area network transferred by using a relay device, or may include a local area network and a wide area network. When the communications network is the local area network, for example, the communications network may be a Wi-Fi hotspot network, a Wi-Fi peer-to-peer (Wi-Fi P2P) network, a Bluetooth network, a ZigBee network, a near-field communication (NFC) network, or a future possible universal short-range communications network. When the communications network is the wide area network, for example, the communications network may be a 3rd-generation mobile communications technology (3rd-generation wireless telephone technology, 3G) network, a 4th generation mobile communications technology (4G) network, a 5th-generation mobile communications technology (5G) network, a PLMN, the Internet, or even a sixth generation or seventh generation mobile communications technology. This is not limited in this embodiment of this application.

In a possible implementation, the primary node 111 may be a network control apparatus, and the secondary node 112 may be a terminal device. Optionally, the network control apparatus may be in a plurality of forms. This is not limited in this embodiment of this application.

In a possible implementation, the network control apparatus may be an independent device.

In another possible implementation, the network control apparatus may be integrated into another device as a function module or a chip apparatus.

It should be noted that the network control apparatus in this embodiment of this application may also be referred to as an access device or a radio access network device, and may be an evolved NodeB (eNB or eNodeB) in an LTE system, or may be a radio controller in a cloud radio access network (CRAN) scenario. Alternatively, the access device may be a relay station, an access point, a vehicle-mounted device, a wearable device, an access device in a 5G network, a network device in a future evolved public land mobile network (PLMN), or the like, may be an access point (AP) in a wireless local area network (WLAN), may be a gNB in a new radio (NR) system, may be a control device or a control apparatus in a cockpit domain, or may be a control device or a control apparatus in a scenario including an intelligent terminal device. This is not limited in this embodiment of this application.

Optionally, the terminal device may be in a plurality of forms. This is not limited in this embodiment of this application.

In a possible implementation, the terminal device may be an independent device.

In another possible implementation, the terminal device may be integrated into another device as a function module or a chip apparatus.

It should be noted that the terminal device in this embodiment of this application may be a device that provides voice/data connectivity for a user, for example, a handheld device or a vehicle-mounted device with a wireless connection function. Currently, for example, some terminal devices are: a mobile phone, a tablet computer, a notebook computer, a palmtop computer, a mobile Internet device (MID), a wearable device, a virtual reality (VR) device, an augmented reality (AR) device, a wireless terminal in self driving, a cellular phone, a cordless phone, a Session Initiation Protocol (SIP) phone, a personal digital assistant (PDA), a handheld device with a wireless communication function, a computing device, a vehicle-mounted device, a smart home device, a wearable device, a terminal device in a 5G network, or a terminal device in a future evolved public land mobile network (PLMN). This is not limited in this embodiment of this application.

It should be further noted that the wearable device may also be referred to as a wearable intelligent device, and is a general term of wearable devices such as glasses, gloves, watches, clothes, and shoes that are developed by applying wearable technologies to intelligent designs of daily wear. The wearable device is a portable device that can be directly worn on a body of a user or integrated into clothes or an accessory of a user.

In a possible implementation, for example, the communication domain 110 is applicable to a cockpit domain environment. Based on a relationship between a terminal device and a cockpit, the terminal device may be of the following two terminal types: a "vehicle-mounted terminal device" and a "non-vehicle-mounted terminal device".

A "vehicle-mounted terminal device", also referred to as an on-board unit (OBU), is a part of a device integrated or disposed in or on a vehicle. Optionally, the vehicle-mounted terminal device may be a device disposed in the cockpit, for example, a vehicle-mounted speaker, a vehicle-mounted microphone, a vehicle-mounted display, or a vehicle-mounted camera. Generally, the vehicle-mounted terminal device may be a device that is factory-installed by a vehicle manufacturer on a vehicle.

A "non-vehicle-mounted terminal device" is a part of a device that is placed on or inside a vehicle and that can communicate with or connect to another device but does not belong to the vehicle, for example, an intelligent terminal such as a smartphone, a tablet computer, a Bluetooth headset, or a wearable device of a user.

In a possible implementation, the network control apparatus may be a CDC, the CDC may communicate with a plurality of terminal devices, and types of the plurality of terminal devices may include at least one terminal type of a vehicle-mounted terminal device or a non-vehicle-mounted terminal device.

Figure 2:
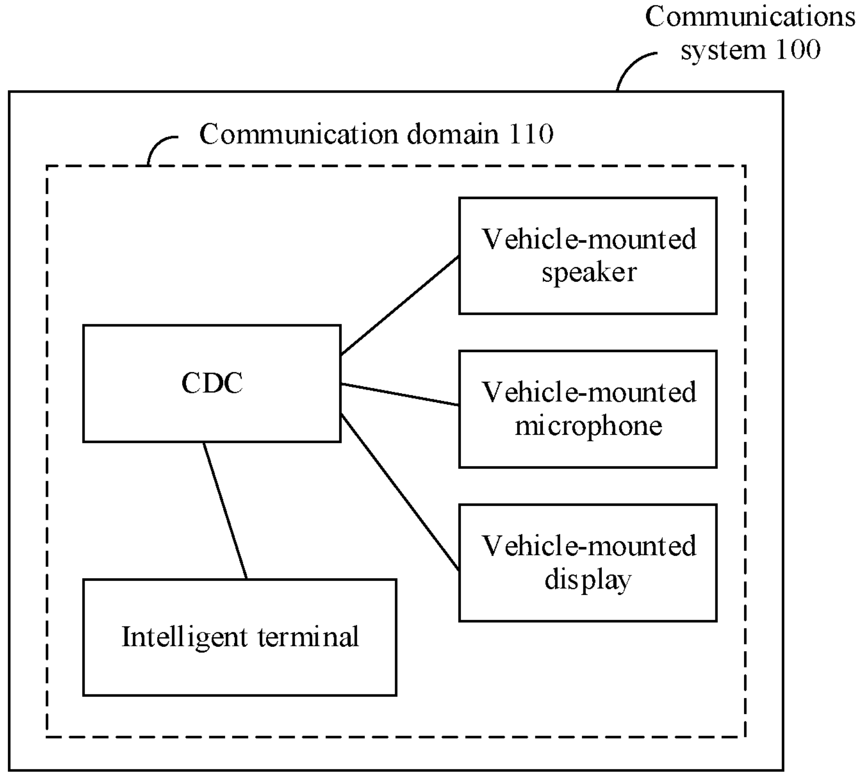
FIG. 2 is another schematic diagram of a structure of a communications system according to an embodiment of this application.

When the communication domain 110 is applicable to the cockpit domain environment, that is, the primary node 111 is a CDC, and the secondary node 112 includes vehicle-mounted terminal devices (such as a vehicle-mounted display, a vehicle-mounted speaker, and a vehicle-mounted microphone) and a non-vehicle-mounted terminal device (such as an intelligent terminal), the communications system 100 may alternatively be of an architecture shown in FIG. 2.

Currently, in a process in which the primary node 111 communicates with the secondary node 112, because a size of a time-frequency resource of a physical layer does not match a size of an upper-layer data packet, the upper-layer data packet may be segmented, additional header information, for example, segmentation offset information is added to segmented data, and then the segmented data is transmitted.

That the secondary node 112 sends service data to the primary node 111 is used as an example. A process of processing to-be-sent service data by the secondary node 112, for example, a process of generating a MAC PDU in an LTE system, includes the following steps.

One MAC PDU generated at a MAC layer may include MAC SDUs (which correspond to an RLC PDU) of one or more logical channels, where each logical channel separately corresponds to one RLC entity.

Figure 3A:
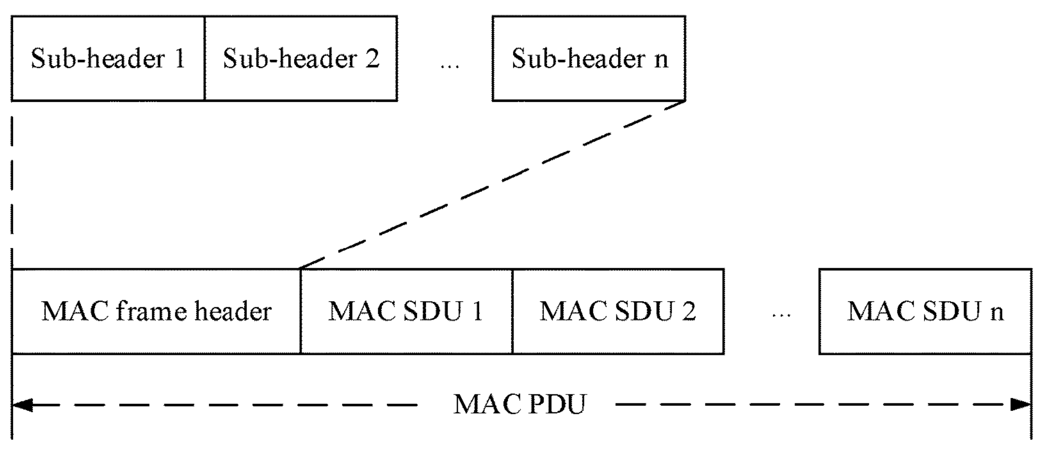
FIG. 3A is a schematic diagram of a format of a MAC PDU according to an embodiment of this application.
Figure 3B:
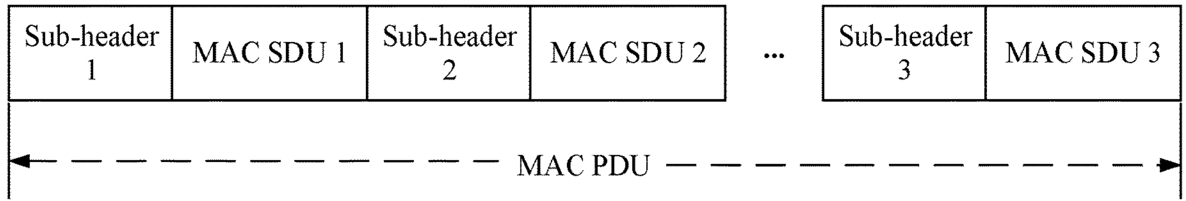
FIG. 3B is another schematic diagram of a format of a MAC PDU according to an embodiment of this application.

When first data (namely, the MAC PDU) includes data on a plurality of logical channels, that is, when the data on the plurality of logical channels is encapsulated in one MAC PDU, a packet header of the MAC PDU includes sub-headers corresponding to MAC SDUs of the plurality of logical channels. It may be understood that, usually, the sub-header corresponding to the MAC SDU includes information related to the MAC SDU. For example, the sub-header of the MAC SDU may include at least one of a logical channel identifier corresponding to the MAC SDU, length indication information of the MAC SDU, and information indicating whether the MAC SDU is a last SDU in the MAC PDU. Optionally, FIG. 3A and FIG. 3B show two optional encapsulation formats of a MAC PDU. As shown in FIG. 3A, a sub-header of a MAC SDU 1 is a sub-header 1, a sub-header of a MAC SDU 1 is a sub-header 2, . . . , and a sub-header of a MAC SDU n is a sub-header n. In the MAC PDU, respective sub-headers of the plurality of MAC SDUs are uniformly encapsulated in a frame header (MAC header) of the MAC PDU. As shown in FIG. 3B, in the MAC PDU, respective sub-headers of a plurality of MAC SDUs are separately located in the front of the MAC SDU, that is, the plurality of MAC SDUs are arranged at intervals.

Figure 4:
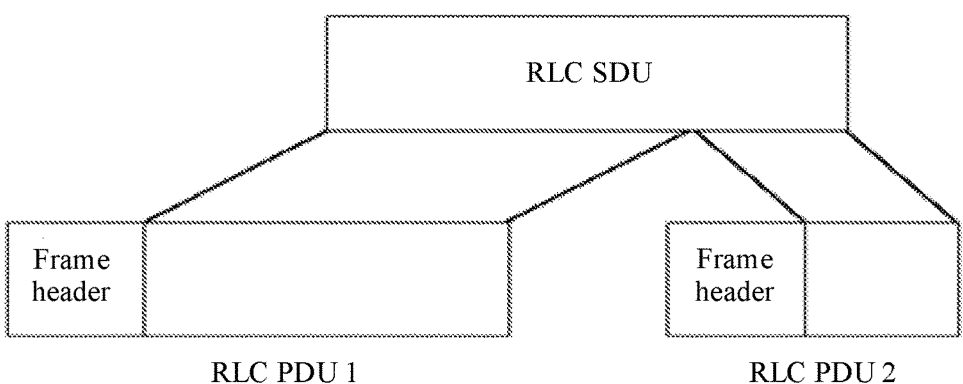
FIG. 4 is a schematic diagram of a process of encapsulating an RLC PDU according to an embodiment of this application.

The MAC layer first determines, based on information such as a size of a time-frequency resource scheduled by the primary node for the MAC layer (the secondary node) and a priority of a current logical channel, a size of a time-frequency resource allocated to each logical channel. The RLC entity corresponding to the logical channel needs to generate at least one RLC PDU based on the determined size of the time-frequency resource. The at least one RLC PDU is considered as a MAC SDU at the MAC layer. It should be noted that, to adapt to a size of a physical resource, when generating the at least one RLC PDU, the RLC entity may perform segmentation (Segmentation) on an RLC SDU. For example, as shown in FIG. 4, an RLC SDU is divided into two parts, and an independent packet header is added to each part to generate an RLC PDU 1 and an RLC PDU 2. Currently, only the RLC PDU 1 is included in the MAC SDU. It may be understood that when determining how to segment the RLC SDU, the RLC entity also considers a bit length (namely, a packet header size) occupied by a packet header corresponding to the SDU. To be specific, the RLC entity comprehensively considers a size of a finally generated RLC PDU including an RLC SDU segment.

For example, in a cockpit environment, in data transmitted between the cockpit domain controller (namely, the primary node) and the terminal device (namely, the secondary node, for example, a vehicle-mounted speaker or a vehicle-mounted microphone), there is data with a large data volume of a data packet, for example, data of a streaming media service, and there is data with a small packet, for example, data of an active noise cancellation service. A common sampling cycle of the active noise cancellation service is 48 kHz, and sampling data of each sampling point is 16 bits or 24 bits, that is, a data packet of the active noise cancellation service may have only 16 bits or 24 bits. In a process of transmitting the data packet of the active noise cancellation service, because a size of a time-frequency resource does not match a size of an upper-layer data packet, the data packet of the active noise cancellation service may also need to be segmented for transmission. However, if the data packet of the service is segmented and additional information, for example, segmentation offset information, is added, a proportion of effective load in the time-frequency resource is severely affected. Consequently, system overheads are greatly increased, and a processing latency is also increased because data is segmented at a transmit end and segmented data is concatenated at a receive end.

To resolve the foregoing problem, an embodiment of this application provides a data transmission method, to improve transmission efficiency and reduce system overheads and a latency.

The following describes in detail the data transmission method provided in this embodiment of this application.

Figure 5:
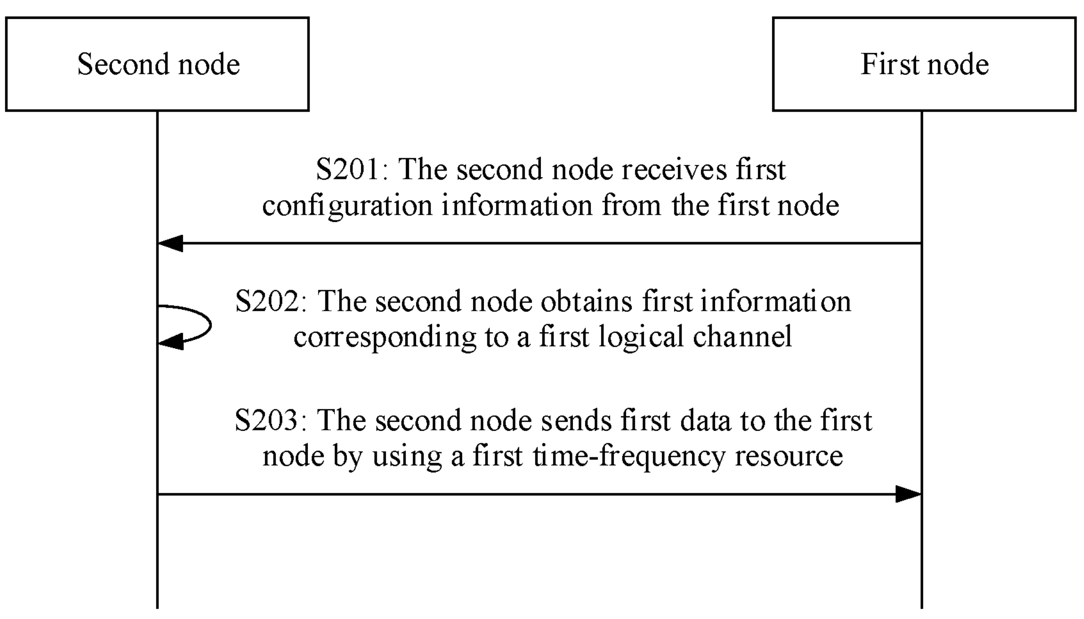
FIG. 5 is a schematic flowchart of a data transmission method according to an embodiment of this application.

FIG. 5 is a schematic flowchart of the data transmission method according to this embodiment of this application. As shown in FIG. 5, the method includes the following steps.

S201: A second node receives first configuration information from a first node.

When the method provided in this embodiment of this application is applied to the communications system 100, the first node may be the primary node 111 in the communications system 100, and the second node may be any secondary node 112 in the communications system 100.

For example, the first node may be a network control apparatus in various forms, and the second node may be a terminal device in various forms. For example, when the method provided in this embodiment of this application is applied to a cockpit domain environment, the first node may be a CDC, and the second node may be a vehicle-mounted terminal device or a non-vehicle-mounted terminal device.

The first configuration information is used to configure a first time-frequency resource.

For example, the first configuration information includes at least one of time domain resource information and frequency domain resource information of the first time-frequency resource, or the first configuration information includes at least one of information used to indicate a time domain resource of the first time-frequency resource and information used to indicate a frequency domain resource of the first time-frequency resource. After receiving the first configuration information, the second node may determine the first time-frequency resource based on the first configuration information, to send data to the first node by using the first time-frequency resource. It should be noted that, if the first configuration information indicates only the time domain resource or the frequency domain resource, the second node may determine, based on a pre-configuration or a standard definition, a time domain resource or a frequency domain resource that is not indicated, to determine the first time-frequency resource.

In a possible design, the first configuration information may be semi-persistent resource configuration information, that is, the first time-frequency resource configured by using the first configuration information is a semi-persistent resource.

In another possible design, the first configuration information may be dynamic resource configuration information, so as to configure the first time-frequency resource for the second node in a dynamic configuration manner.

In a possible design, the first configuration information may be carried on radio resource control (Radio Resource Control, RRC) signaling. Optionally, the RRC signaling includes system information.

In a possible design, the first configuration information may alternatively be carried on a physical layer control channel, for example, a downlink control information (Downlink Control Information, DCI).

In a possible design, the first configuration information may alternatively be included in a management frame, and the management frame can implement management functions such as management of a connection between a primary node and a secondary node and resource configuration.

S202: The second node obtains first information corresponding to a first logical channel.

For example, the first logical channel may specifically correspond to an RLC entity in the second node, or may correspond to a data queue of a service. For example, when the second node is a vehicle-mounted microphone, and the first node is a CDC, data on the first logical channel may be a data queue corresponding to an active noise cancellation service, or data on the first logical channel may be an RLC SDU in a first RLC entity, and the RLC SDU in the first RLC entity may include data of an active noise cancellation service. It may be understood that the first logical channel may alternatively correspond to an SDU in another protocol entity, for example, a PDCP entity. This may not be limited in this application.

The first information corresponding to the first logical channel is used to indicate whether segmentation of a data packet on the first logical channel is allowed, the first logical channel corresponds to a second time-frequency resource, and the second time-frequency resource is included in the first time-frequency resource.

Specifically, that the first logical channel corresponds to the first information may be understood as that the second node may correspond to a plurality of logical channels. Generally, data packets on logical channels that are carried on the first time-frequency resource and/or quantities of data packets that are carried on different logical channels need to be determined in comprehensive consideration of at least one of a priority of a logical channel, a size of data on the logical channel, and the like. This may be usually agreed on in a data encapsulation rule or a protocol. A specific rule and an agreement manner are not specifically limited in this application.

In an example, the second time-frequency resource corresponding to the first logical channel may be a time-frequency resource that is determined by a media access control layer for the first logical channel based on at least one of a priority of the logical channel and a size of data on the logical channel and that meets the data encapsulation rule or that is predetermined in the protocol.

In another example, a size of the second time-frequency resource corresponding to the first logical channel may be a size of a time-frequency resource that is determined by a media access control layer for the first logical channel based on at least one of data encapsulation rules such as a priority of the logical channel and a size of data on the logical channel and that meets the data encapsulation rule or that is predetermined in the protocol. A specific location of a time-frequency resource is not considered in this example temporarily.

Optionally, the first logical channel corresponds to a first data queue. For example, the first logical channel is used to transmit a data packet in the first data queue. Determining whether segmentation of the data packet on the first logical channel is allowed may be determining whether segmentation of a service data packet on the first logical channel is allowed.

Optionally, the first logical channel corresponds to a first protocol stack entity. For example, the first logical channel corresponds to an RLC entity. To be specific, the first logical channel is used to transmit a data packet from the RLC entity. Whether segmentation of the data packet on the first logical channel is allowed may be whether segmentation of an SDU in the first protocol entity corresponding to the first logical channel is allowed. For example, the first protocol entity may be an RLC entity, and the SDU in the first protocol entity may be an RLC SDU. An example in which the first logical channel corresponds to an RLC entity is mostly used below for descriptions. A person skilled in the art may understand that the RLC entity may be replaced with a protocol stack entity of another type, for example, a possible entity types in various short-range wireless communications systems.

In other words, when the data packet on the first logical channel needs to be transmitted, whether the data packet on the first logical channel can be sent by using the second time-frequency resource corresponding to the first logical channel is affected by content indicated by the first information. For example, if the first information is used to indicate that segmentation of the data packet on the first logical channel is not allowed, the data packet on the first logical channel needs to be segmented when the data packet on the first logical channel is sent by using the second time-frequency resource. In this case, based on the indication of the first information, the data packet on the first logical channel cannot be sent actually by using the second time-frequency resource. In addition, whether the data packet on the first logical channel can be sent by using the second time-frequency resource corresponding to the first logical channel is further affected by a size of the second time-frequency resource.

In other words, whether the data packet on the first logical channel is sent by using the second time-frequency resource may be specifically determined based on at least one of the first information and the second time-frequency resource.

In a possible design, it is considered that, in a process of transmitting some services, if data packets of the services are segmented, system overheads may be severely affected, and a processing latency may be increased. For example, the data packet of the active noise cancellation service mentioned in the foregoing content is not suitable for segmentation. Therefore, the data packet on the first logical channel may include a service data packet.

Further, the first information is specifically used to indicate whether segmentation of the service data packet on the first logical channel is allowed. In this way, when the service data packet on the first logical channel is a service data packet that is not suitable for segmentation, the first information may be used to indicate that segmentation of the service data packet on the first logical channel is not allowed, so as to avoid segmentation of the service data packet on the first logical channel.

The service data packet may be understood as a data packet carrying a service, for example, a data packet carrying an active noise cancellation service, or a data packet carrying a video service. Optionally, the service data packet may be a data packet transmitted from a network layer to a lower layer. For example, an IP data packet or a non-IP data packet carrying video service data. Optionally, the service data packet may be a data packet transmitted from an application layer to a lower layer. It should be noted that the lower layer herein is a relative concept. In another possible design, it is considered that segmentation may not be suitable in a control signaling transmission process. Therefore, the first information may be used to indicate whether segmentation of control signaling on the first logical channel is allowed. For example, the control signaling may be dedicated RRC signaling sent by the secondary node to the primary node.

In other words, the data packet on the first logical channel may include the control signaling. It should be noted that, in some scenarios, the control signaling may also be referred to as a management frame.

In a possible design, it is considered that the first node may control whether segmentation of the data packet on the first logical channel is allowed. Therefore, S202 may include the following step.

S202*a*: The second node receives second configuration information from the first node.

The second configuration information is used to configure the first information corresponding to the first logical channel.

Similar to S201, the second configuration information may also be carried in a plurality of different forms. The second configuration information may be carried on RRC signaling, or the second configuration information may be carried on DCI, or the second configuration information may be carried on a physical layer control channel. For a specific form of carrying the second configuration information, refer to the form of carrying the first configuration information. Details are not described herein again.

For example, when the first node is the primary node 111 in the communications system 100 and the second node is the secondary node 112, by using the foregoing design, when the secondary node sends data to the primary node, the primary node can control whether the secondary node allows segmentation of the data packet on the first logical channel.

Optionally, the second configuration information may be configuration information of the first protocol entity corresponding to the first logical channel.

Optionally, the second configuration information includes first mode information. The first mode information is used to indicate that the second node works in a first mode and segmentation of the data packet on the first logical channel is not allowed. The second node may be in a plurality of working modes, and the plurality of working modes include the first mode. When the second node works in the first mode, segmentation of the data packet on the first logical channel is not allowed. For example, the first mode may be a low-latency transmission mode. When working in the low-latency transmission mode, because segmentation processing causes more latencies, the second node does not allow or cannot accept segmentation of the data packet on the first logical channel. In other words, mode information of the low-latency transmission mode is used to indicate that the second node works in the corresponding mode and also indicate that segmentation of the data packet on the first logical channel is not allowed. A working mode type is not specifically limited in this application. Herein, only mode information of different modes may be used to indicate whether segmentation is allowed.

Optionally, similar to S201, data on a logical channel may be an SDU or service data corresponding to the first protocol entity. Details are not described herein again.

In another possible design, it is considered that the second node may determine, based on an attribute of the first logical channel, whether segmentation of the data packet on the first logical channel is allowed. Further, S202 may include the following step.

S202*b*: The second node determines, based on quality of service (QoS) information or a service type corresponding to data on the first logical channel, the first information corresponding to the first logical channel. The quality of service information or the service type corresponding to the data on the first logical channel may be specifically quality of service information or a service type of service data encapsulated in the data packet on the first logical channel, or may be quality of service information or a service type of the data packet (for example, an SDU or a PDU) on the first logical channel. This may not be limited in this application.

It should be noted that the QoS information or the service type is merely an example. This application is not limited to determining the first information based on only the QoS information or the service type. The second node may determine the first information based on any one or more types of information on the first logical channel or the data on the first logical channel. Alternatively, the quality of service information or the service type may be considered as the first information. In other words, obtaining the first information corresponding to the first logical channel may be understood as obtaining quality of service information or a service type corresponding to the first logical channel. The quality of service information or the service type corresponding to the first logical channel is used to indicate whether segmentation of the data packet on the first logical channel is allowed.

For example, if the QoS information corresponding to the data on the first logical channel reflects that the data packet on the first logical channel is not suitable for segmentation, it is determined that the first information indicates that segmentation of the data packet on the first logical channel is not allowed. Alternatively, if the QoS information corresponding to the first logical channel reflects that the data packet on the first logical channel can be segmented, it is determined that the first information indicates that segmentation of the data packet on the first logical channel is allowed. In this way, a manner of sending the data packet on the first logical channel matches the quality of service QoS information corresponding to the first logical channel. Similarly, a similar effect may also be achieved by determining, based on the service type corresponding to the first logical channel, the first information corresponding to the first logical channel.

Optionally, the QoS information that is of the data and that skips allowing segmentation of the data packet may be agreed in a protocol, and the QoS information is used to indicate QoS need or a requirement of the data on the logical channel. For example, the QoS need or requirement may include but is not limited to one or more of a priority of data, reliability of data, a data rate, a transmission latency of data, and a communication range of data. Optionally, the QoS information may be a QoS class index QCI or a QoS flow identifier (QoS flow ID). This is not limited in this embodiment of this application. Optionally, a correspondence between a QCI or a QoS flow ID and a corresponding QoS need or requirement may be agreed on in a protocol.

Optionally, service type information that is of the data and that skips allowing segmentation of the data packet may be agreed on in a protocol. The service type information is used to indicate a service type of the data on the logical channel. Optionally, the service type may be distinguished based on an application identifier (application ID, AID). For example, an AID of an active noise cancellation service is 1, and an AID of a video service is 2. For example, segmentation of the active noise cancellation service is not allowed. For another example, segmentation of the dedicated RRC signaling is not allowed.

S203: The second node sends first data to the first node by using the first time-frequency resource.

Specifically, after determining that the second node needs to send data by using the first time-frequency resource, the second node may send the data, namely, the first data, to the first node by using the first time-frequency resource.

For example, the first data is a MAC PDU, and the MAC PDU includes at least one MAC SDU. A single MAC SDU may include one or more pieces of data on a logical channel. Therefore, the second time-frequency resource corresponding to the first logical channel may include a time-frequency resource used for at least one piece of data on the first logical channel. For example, when the first data includes the data packet on the first logical channel, the data packet (for example, an RLC SDU) on the first logical channel is encapsulated into an RLC PDU (also referred to as a MAC SDU) (for example, a MAC SDU 1). Further, the MAC SDU 1 is carried in the second time-frequency resource in a transmission process. In an implementation, whether the second time-frequency resource is sufficient to carry the data packet on the first logical channel may be determined by considering not only a size of an RLC SDU, but also a size of an RLC PDU generated after the RLC SDU is processed. In another implementation, whether the second time-frequency resource is sufficient to carry the data packet on the first logical channel may be determined by considering only a size of an RLC SDU and skipping considering a size of an RLC PDU generated after the RLC SDU is processed. A specific implementation may depend on a specific communication scenario or a protocol agreement. For the following description about whether a time-frequency resource is sufficient to carry a data packet, refer to this paragraph.

It should be noted that there may be one or more MAC SDUs corresponding to the first logical channel. This is not limited in the present disclosure.

Optionally, a sub-header of the MAC SDU corresponding to the first logical channel carries a logical channel identifier (LCID) or a QoS class identifier (QCI), and is used to distinguish the MAC SDU corresponding to the first logical channel from a MAC SDU corresponding to another logical channel.

When the first data is the MAC PDU, in an example, a sub-header of a MAC SDU in the first data may be located in a header of the first data.

For example, when the first data is a MAC PDU, FIG. 3A shows a frame structure of the first data. The first data may include a MAC header, a MAC control element, a MAC SDU, and a padding field. A sub-header of the MAC SDU is located at a location of the MAC header.

In another example, sub-headers of MAC SDUs in the first data may be arranged at intervals with the MAC SDUs.

For example, FIG. 3B shows another frame structure of the first data. A sub-header of each MAC SDU is located in front of a corresponding MAC SDU.

Optionally, the frame structure shown in FIG. 3B may further include a MAC control element and/or a padding field.

Optionally, the frame structure shown in FIG. 3B may further include a sub-header corresponding to the MAC CE.

Optionally, the frame structure shown in FIG. 3B may further include a sub-header corresponding to the padding field.

It should be noted that when the first data is a MAC PDU, a location of a sub-header of each MAC SDU in the first data may not be limited in this application.

In addition, when the first data is the MAC PDU, and the MAC PDU corresponds to only one logical channel, the second time-frequency resource corresponding to the first logical channel may also be an available resource of the MAC PDU.

It should be noted that, in some embodiments, the second node may alternatively not send the data to the first node by using the first time-frequency resource.

For example, when the first time-frequency resource is used to carry only the data on the first logical channel, the first information indicates that segmentation of the data packet on the first logical channel is not allowed, and the data packet on the first logical channel cannot be carried on the first time-frequency resource when the data packet on the first logical channel is not segmented, the second node may not send the data to the first node by using the first time-frequency resource.

For example, when the first time-frequency resource is used to carry only the data on the first logical channel, a maximum value of a data volume that can be carried by an available resource in the first time-frequency resource is 1 megabyte (MB), a size of a smallest data packet on the first logical channel exceeds 1 MB, and segmentation of the data packet on the first logical channel is not allowed, the second node may not send the data to the first node by using the first time-frequency resource.

For another example, when the first time-frequency resource is used to carry data on a plurality of logical channels, if each of a plurality of logical channels (the plurality of logical channels include the first logical channel) carried in the first time-frequency resource determines, based on the foregoing solution, that segmentation of a data packet on the logical channel is not allowed, and the data packet on the logical channel cannot be carried on the first time-frequency resource without when segmentation of the data packet on the logical channel is not allowed, the second node may not send the data to the first node by using the first time-frequency resource.

In an implementation, when it is determined whether the first time-frequency resource is sufficient to carry the data packet on the first logical channel, a size of header information of the data packet is considered. For example, when the first logical channel corresponds to a first RLC entity, a size of the RLC PDU is considered when it is determined whether the first time-frequency resource can carry the data packet on the first logical channel.

In another implementation, when it is determined whether the first time-frequency resource is sufficient to carry the data packet on the first logical channel, a size of header information of the data packet is not considered, for example, in a transparent transmission mode or another possible scenario. For example, when the first logical channel corresponds to a first RLC entity, a size of the RLC SDU is considered when it is determined whether the first time-frequency resource can carry the data packet on the first logical channel.

Therefore, when the second node may not send the data to the first node by using the first time-frequency resource, content of S203 may not be performed in the technical solution provided in this application.

In a possible design, when the first information indicates that segmentation of the data packet on the first logical channel is not allowed, segmentation of the data packet on the first logical channel can be avoided in a manner that whether the size of the second time-frequency resource is sufficient to carry all data packets on the first logical channel is determined in some manners, and if it is determined that the size of the second time-frequency resource is insufficient to carry all the data packets on the first logical channel, the data packet on the first logical channel is not sent by using the second time-frequency resource (the first data includes no data packet on the first logical channel).

To be specific, the foregoing method provided in this embodiment of this application may specifically include the following steps.

S301: A second node receives first configuration information from a first node. The first configuration information is used to configure a first time-frequency resource.

S302: The second node obtains first information corresponding to a first logical channel.

The first information is used to indicate whether segmentation of a data packet on the first logical channel is allowed. Specifically, the first information is used to indicate that segmentation of the data packet on the first logical channel is not allowed.

The first logical channel corresponds to a second time-frequency resource, the second time-frequency resource is included in the first time-frequency resource, and a size of the second time-frequency resource is insufficient to carry all data packets on the first logical channel.

S303: The second node sends first data to the first node by using the first time-frequency resource.

The first data includes no data packet on the first logical channel.

For same content in implementations of S301 to S303 and S201 to S203, refer to corresponding description of S201 to S203. Details are not described herein again.

To be specific, it is considered that a lower-layer protocol stack entity of the first logical channel usually cannot obtain a size of each data packet on the first logical channel, and can obtain only a total size of all the data packets on the first logical channel. Therefore, to avoid segmentation when some data packets are sent, in the foregoing design, when the first information indicates that segmentation of the data packet on the first logical channel is not allowed, and it is determined that the size of the second time-frequency resource is insufficient to carry all the data packets on the first logical channel, the first data includes no data packet on the first logical channel, so as to avoid segmentation of the data packet on the first logical channel.

In another possible design, when the first information indicates that segmentation of the data packet on the first logical channel is not allowed, segmentation of the data packet on the first logical channel can be avoided in a manner that whether the size of the second time-frequency resource is sufficient to carry any data packet on the first logical channel is determined in some manners, and if it is determined that the size of the second time-frequency resource is insufficient to carry any data packet on the first logical channel, the data packet on the first logical channel is not sent by using the second time-frequency resource. Alternatively, when the data packet on the first logical channel corresponds to a sending sequence, segmentation of the data packet on the first logical channel can be avoided in a manner that whether the size of the second time-frequency resource is sufficient to carry the 1*st* data packet (that is, the 1*st* data packet to be sent) on the first logical channel is determined in some manners, and if it is determined that the size of the second time-frequency resource is insufficient to carry the 1*st* data packet on the first logical channel, the data packet on the first logical channel is not sent by using the second time-frequency resource. As described above, when whether the size of the second time-frequency resource is sufficient to carry any data packet or the 1*st* data packet on the first logical channel is determined, a PDU size of a protocol stack entity corresponding to the first logical channel may be considered, or an SDU size of a protocol stack entity corresponding to the first logical channel may be considered. A specific implementation depends on a communication scenario or a protocol agreement.

The foregoing method provided in this embodiment of this application may specifically include the following steps.

S401: A second node receives first configuration information from a first node. The first configuration information is used to configure a first time-frequency resource.

S402: The second node obtains first information corresponding to a first logical channel.

The first information is used to indicate whether segmentation of a data packet on the first logical channel is allowed. Specifically, the first information is used to indicate that segmentation of the data packet on the first logical channel is not allowed.

The first logical channel corresponds to a second time-frequency resource, the second time-frequency resource is included in the first time-frequency resource, and a size of the second time-frequency resource is insufficient to carry any data packet or the 1st data packet on the first logical channel.

S403: The second node sends first data to the first node by using the first time-frequency resource.

The first data includes no data packet on the first logical channel.

For same content in implementations of S401 to S403 and S201 to S203, refer to corresponding description of S201 to S203. Details are not described herein again.

In the foregoing design, when the first information indicates that segmentation of the data packet on the first logical channel is not allowed, and the size of the second time-frequency resource is insufficient to carry any data packet or the 1st data packet on the first logical channel, the first data includes no data packet on the first logical channel, so as to avoid segmentation of the data packet on the first logical channel.

In still another possible design, it is considered that when the second node sends the first data to the first node, which data packets on the first logical channel are carried in the second time-frequency resource is affected by content indicated by the first information, and is further affected by the size of the second time-frequency resource. To be specific, when the second node sends the first data to the first node, which data packets on the first logical channel are carried in the second time-frequency resource may be specifically determined based on at least one of the first information and the second time-frequency resource.

To be specific, at least one data packet on the first logical channel may be sent to the first node based on at least one of the first information or the size of the second time-frequency resource by using the second time-frequency resource.

Therefore, the foregoing method provided in this embodiment of this application may specifically include the following steps.

S501: A second node receives first configuration information from a first node. The first configuration information is used to configure a first time-frequency resource.

S502: The second node obtains first information corresponding to a first logical channel.

The first information is used to indicate whether segmentation of a data packet on the first logical channel is allowed.

The first logical channel corresponds to a second time-frequency resource, and the second time-frequency resource is included in the first time-frequency resource.

S503: The second node sends first data to the first node by using the first time-frequency resource.

The first data includes at least one data packet on the first logical channel.

The at least one data packet on the first logical channel is sent to the first node based on at least one of the first information or a size of the second time-frequency resource by using the second time-frequency resource.

For same content in implementations of S501 to S503 and S201 to S203, refer to corresponding description of S201 to S203. Details are not described herein again.

In an implementation, when it is determined that the size of the second time-frequency resource is sufficient to carry all data packets on the first logical channel, the first data may include all the data packets on the first logical channel without considering content indicated by the first information, to send the data packet on the first logical channel.

Therefore, the foregoing method provided in this embodiment of this application may specifically include the following steps.

S601: A second node receives first configuration information from a first node. The first configuration information is used to configure a first time-frequency resource.

S602: The second node obtains first information corresponding to a first logical channel.

The first information is used to indicate whether segmentation of a data packet on the first logical channel is allowed.

The first logical channel corresponds to a second time-frequency resource, the second time-frequency resource is included in the first time-frequency resource, and a size of the second time-frequency resource is sufficient to carry all data packets on the first logical channel.

S603: The second node sends first data to the first node by using the first time-frequency resource.

The first data includes all the data packets on the first logical channel.

For same content in implementations of S601 to S603 and S201 to S203, refer to corresponding description of S201 to S203. Details are not described herein again.

To be specific, in the foregoing design, when the size of the second time-frequency resource is sufficient to carry all the data packets on the first logical channel, regardless of whether the first information indicates that segmentation of the data packet on the first logical channel is allowed or segmentation of the data packet on the first logical channel is not allowed, all the data packets on the first logical channel are carried in the second time-frequency resource. Based on the foregoing design, when the size of the second time-frequency resource is sufficient to carry all the data packets on the first logical channel, a processing process of the first node may be simplified, that is, all the data packets on the first logical channel may be sent without reading the first information.

In another implementation, when the at least one data packet on the first logical channel is sent to the first node based on at least one of the first information or the size of the second time-frequency resource by using the second time-frequency resource, it is considered that when the first information is used to indicate that segmentation of the data packet on the first logical channel is not allowed, if the size of the second time-frequency resource is insufficient to carry all the data packets on the first logical channel, but the size of the second time-frequency resource is sufficient to carry the at least one data packet on the first logical channel, data may be transmitted in a manner in which the first data includes the at least one data packet on the first logical channel.

Therefore, the foregoing method provided in this embodiment of this application may specifically include the following steps.

S701: A second node receives first configuration information from a first node. The first configuration information is used to configure a first time-frequency resource.

S702: The second node obtains first information corresponding to a first logical channel.

The first information is used to indicate whether segmentation of a data packet on the first logical channel is allowed. In an implementation, the first information is used to indicate that segmentation of the data packet on the first logical channel is not allowed.

The first logical channel corresponds to a second time-frequency resource, the second time-frequency resource is included in the first time-frequency resource, and a size of the second time-frequency resource is insufficient to carry all data packets on the first logical channel but is sufficient to carry at least one data packet on the first logical channel.

In an implementation, the at least one data packet on the first logical channel may be specifically at least one data packet in a first sending sequence on the first logical channel.

S703: The second node sends first data to the first node by using the first time-frequency resource.

The first data includes the at least one data packet on the first logical channel.

For same content in implementations of S701 to S703 and S201 to S203, refer to corresponding description of S201 to S203. Details are not described herein again.

In other words, in the foregoing design, when the first information is used to indicate that segmentation of the data packet on the first logical channel is not allowed, if the size of the second time-frequency resource is insufficient to carry all the data packets on the first logical channel, but the size of the second time-frequency resource is sufficient to carry the at least one data packet on the first logical channel, the data may be transmitted in a manner in which the first data includes the at least one data packet on the first logical channel.

In a possible design, it is considered that the first time-frequency resource may correspond to a plurality of logical channels. Therefore, the first data sent by using the first time-frequency resource may further include at least one data packet on another logical channel other than the first logical channel. Further, in the foregoing method in this application, the first data includes at least one data packet on a second logical channel.

For example, when the first data is a MAC PDU, the at least one data packet on the second logical channel may be encapsulated in one or more MAC SDUs in the MAC PDU.

In an implementation, the method provided in this embodiment of this application may include: A priority of the second logical channel is lower than a priority of the first logical channel.

According to the data transmission method provided in this embodiment of this application, the first information corresponding to the first logical channel is set, to control whether segmentation of the data packet on the first logical channel is allowed when the data packet on the first logical channel is sent. Further, when the first logical channel is used to transmit a small packet, the first information may be used to indicate that segmentation of the data packet on the first logical channel is not allowed, so as to avoid segmentation of the small packet, increase a proportion of effective load in a time-frequency resource, and reduce system overheads and a processing latency.

Figure 6:
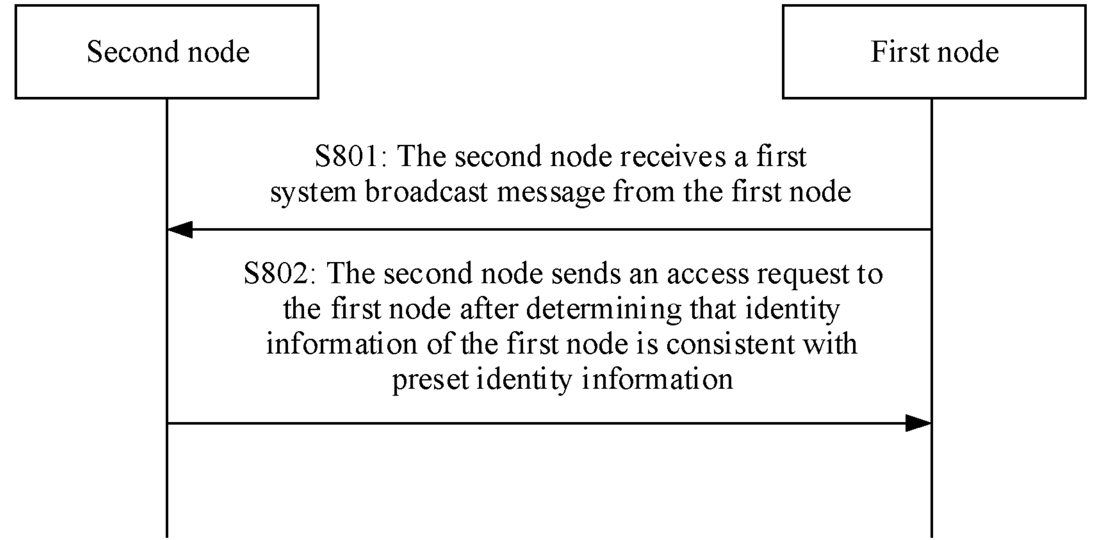
FIG. 6 is a schematic flowchart of a communication method according to an embodiment of this application.

In another embodiment, an embodiment of this application further provides a communication method. The method may be applied to the communications system 100 to establish a connection between nodes. Specifically, the method may be used to establish a connection between the first node and the second node in the foregoing embodiments. The following describes the communication method by using an example in which a connection is established between a first node and a second node. As shown in FIG. 6, the method includes the following steps.

S801: A second node receives a first system broadcast message from a first node.

The first system broadcast message includes identity information of the first node.

Optionally, the first identity information may be understood as information that can uniquely identify an identity of the first node in a communication domain in which the first node is located.

Specifically, the identity information of the first node may be at least one of a device identifier, a MAC address, a soft address, and a short address of the first node.

It should be noted that the device identifier is a string of digits or a serial number that can uniquely identify the first node, for example, an international mobile equipment identity (IMEI) or a mobile equipment identifier (MEID).

It should be further noted that the MAC address is an address used at a media access control layer, and is also referred to as a physical address or a hardware address.

It should be further noted that the soft address may be an address or an identifier (ID) that can uniquely identify the first node in the communication domain.

It should be further noted that the short address may be an address or an identifier obtained based on a part of at least one of the foregoing device identifier, MAC address, and soft address.

S802: The second node sends an access request to the first node after determining that the identity information of the first node is consistent with preset identity information.

According to the communication method provided in this embodiment of this application, before sending the access request to the first node, the second node first authenticates the identity information of the first node, and sends the access request to the first node after authentication succeeds. In this way, the second node is prevented from sending the access request to an incorrect node. For example, when the second node is a vehicle-mounted or non-vehicle-mounted device in a cockpit domain and the first node is a CDC, the second node may be prevented from establishing a connection to a CDC on another external vehicle.

Figure 7:
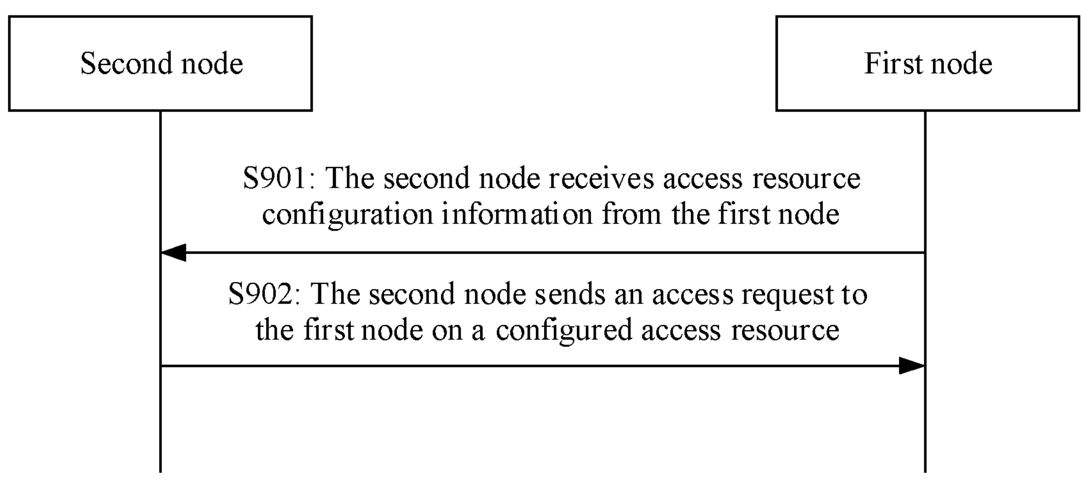
FIG. 7 is another schematic flowchart of a communication method according to an embodiment of this application.

In another embodiment, an embodiment of this application further provides a communication method. The method may be applied to the communications system 100 to establish a connection between nodes. Specifically, the method may be used to establish a connection between the first node and the second node in the foregoing embodiments. The following describes the communication method by using an example in which a connection is established between a first node and a second node. As shown in FIG. 7, the method includes the following steps.

S901: A second node receives access resource configuration information from a first node.

The access resource configuration information is used to configure an access resource used to establish a connection (also referred to as access) to the first node. The access resource may include at least one time-frequency resource.

Optionally, the access resource configuration information further includes information about an access manner corresponding to the access resource, for example, one bit is used to indicate the access manner. Alternatively, the access resource configuration information is further used to indicate an access manner corresponding to the access resource. For example, the access manner may be at least one of contention-based access or non-contention-based access.

In an implementation, the access resource configuration information is used to indicate contention-based access, and the at least one time-frequency resource included in the access resource is used for contention-based access of a plurality of second nodes.

For example, when the access resource configuration information is used to indicate contention-based access, and the access resource includes the at least one time-frequency resource, after receiving the access resource configuration information, the second node may send an access request to the first node by using the at least one time-frequency resource in a contention-based access manner.

In another implementation, the access resource configuration information is used to indicate the non-contention based access, and the second node sends an access request by using the access resource. Optionally, the second node may send the access request by using a part of the access resource.

For example, when the access resource configuration information is used to indicate non-contention-based access, after the second node receives the access resource configuration information, after receiving the access resource configuration information, the second node may send the access request to the first node by using a time-frequency resource included in the access resource based on a non-contention-based access method.

In still another implementation, the access resource configuration information is used to indicate non-contention-based access and contention-based access, the access resource includes at least two time-frequency resources, and the at least two time-frequency resources include a time-frequency resource used for non-contention-based access and a time-frequency resource used for contention-based access.

It may be understood that, for contention-based access, as the name implies, the plurality of second nodes may send access requests to the first node on a same time-frequency resource. For non-contention-based access, that is, the plurality of second nodes send access requests to the first node on mutually orthogonal (non-overlapping) time-frequency resources.

Optionally, the access resource configuration information may be system information or RRC signaling.

S902: The second node sends an access request to the first node on the configured access resource.

Optionally, when the access manner is contention-based access, the second node randomly selects a first resource from the access resource, and sends the access request to the first node on the first resource.

In an implementation, when the access resource is a periodic resource, the second node may randomly select a time unit, and send the access request by using an access resource corresponding to the time unit. The time unit may be specifically a time unit, for example, a symbol, a timeslot, a radio frame, or a superframe. The symbol may be an orthogonal frequency division multiplexing OFDM symbol. Duration of one superframe may be 1 ms, and one superframe may include a plurality of radio frames. For example, a quantity of the radio frames may also be 48. Optionally, one radio frame may include a plurality of symbols, and a length of the radio frame may be 1/48 kHz, which is about 20.83 s. A quantity of symbols included in each radio frame may be predefined. Further, a transmission direction of each symbol in each radio frame may be configured or notified by the first node. Specifically, the radio frame may sequentially include a first time domain resource, the first guard period GP, a second time domain resource, and a second GP in time domain. Further optionally, the first time domain resource is used to map information or a signal (in a downlink direction) from the first node, the second time domain resource is used to map information or a signal (in an uplink direction) sent to the first node, and the first GP and the second GP are used to perform transmission conversion in different directions, for example, receive/transmit conversion or transmit/receive conversion.

Optionally, that the second node sends the access request to the first node on the first resource may include: sending the access request to the first node, and sending second identity information of the second node to the first node on the first resource.

When the access manner is non-contention-based access, the second node determines a second resource from the access resource based on the second identity information of the second node, and sends the access request to the first node on the second resource. Optionally, that the second node sends the access request to the first node on the second resource may include: sending third identity information of the second node to the first node on the second resource. Optionally, the third identity information may be understood as information that can uniquely identify an identity of the second node in a communication domain in which the second node is located.

Optionally, the second identity information and the third identity information may be the same or different.

Optionally, the second identity information or the third identity information may be at least one of a device identifier, a MAC address, a soft address, and a short address.

It should be noted that the device identifier is a string of digits or a serial number that can uniquely identify the device, for example, an international mobile equipment identity IMEI or a mobile equipment identifier MEID.

It should be further noted that the MAC address is an address used at a media access control layer, and is also referred to as a physical address or a hardware address.

It should be further noted that the soft address may be an address or an ID that can uniquely identify the node in the communication domain. Optionally, the soft address may be preconfigured when the device is delivered from a factory.

It should be further noted that the short address may be an address or an identifier obtained based on a part of at least one of the foregoing device identifier, MAC address, and soft address.

The foregoing mainly describes the solutions provided in embodiments of this application from a perspective of interaction between devices. It should be understood that, to implement a corresponding function, the terminal device or the network device includes a corresponding hardware structure and/or software module for performing the function. A person of ordinary skill in the art should easily be aware that, in combination with the units in the examples described in embodiments disclosed in this specification, this application may be implemented by hardware or a combination of hardware and computer software. Whether a function is implemented by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this embodiment, the devices (which include the terminal device and the network device) may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. Optionally, in embodiments of this application, module division is an example, and is merely a logical function division. There may be another division manner during actual implementation.

Figure 8:
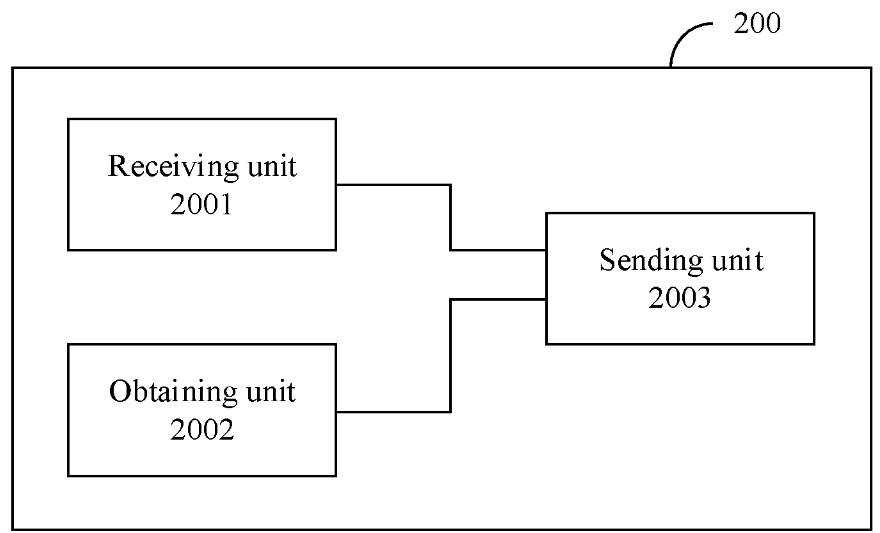
FIG. 8 is a schematic diagram of a structure of a data transmission apparatus according to an embodiment of this application.

FIG. 8 is a schematic composition diagram of a data transmission apparatus 200 according to an embodiment of this application. The data transmission apparatus 200 may be a chip or a system on a chip. The data transmission apparatus 200 may be configured to implement a function of the second node in the foregoing embodiments. In a possible implementation, the data transmission apparatus 200 includes: a receiving unit 2001, configured to receive first configuration information from a first node, where the first configuration information is used to configure a first time-frequency resource; an obtaining unit 2002, configured to obtain first information corresponding to a first logical channel, where the first information is used to indicate whether segmentation of a data packet on the first logical channel is allowed, the first logical channel corresponds to a second time-frequency resource, and the second time-frequency resource is included in the first time-frequency resource; and a sending unit 2003, configured to send first data to the first node by using the first time-frequency resource.

Optionally, the first data includes no data packet on the first logical channel. The first information is used to indicate that segmentation of the data packet on the first logical channel is not allowed, and a size of the second time-frequency resource is insufficient to carry all data packets on the first logical channel. Alternatively, the first information is used to indicate that segmentation of the data packet on the first logical channel is not allowed, and a size of the second time-frequency resource is insufficient to carry any data packet or the 1$^{st}$ data packet on the first logical channel.

Optionally, the first data includes at least one data packet on the first logical channel.

The sending unit 2003 is specifically configured to send the at least one data packet based on at least one of the first information or a size of the second time-frequency resource by using the second time-frequency resource.

Optionally, the first data includes all data packets on the first logical channel. The size of the second time-frequency resource is sufficient to carry all the data packets on the first logical channel.

Optionally, the first data includes the at least one data packet on the first logical channel.

The first information is used to indicate that segmentation of the data packet on the first logical channel is not allowed, and the size of the second time-frequency resource is insufficient to carry all data packets on the first logical channel but is sufficient to carry the at least one data packet.

Optionally, the first logical channel corresponds to a first data queue, and the data packet on the first logical channel includes a service data packet, or the data packet on the first logical channel includes control signaling.

Optionally, the first logical channel corresponds to a first protocol stack entity, and the data packet on the first logical channel is a service data unit in the first protocol stack entity.

Optionally, the obtaining unit 2002 is configured to receive second configuration information from the first node. The second configuration information is used to configure the first information corresponding to the first logical channel.

Optionally, the obtaining unit 2002 is configured to determine, based on quality of service QoS information or a service type corresponding to data on the first logical channel, the first information corresponding to the first logical channel.

Optionally, the first data includes at least one data packet on a second logical channel.

It should be noted that all related content of the steps in the foregoing method embodiments may be cited in function description of corresponding function modules. Details are not described herein again. The data transmission apparatus 200 provided in this embodiment of this application is configured to implement the function of the second node in the foregoing data transmission method, to achieve a same effect as the foregoing data transmission method.

Figure 9:
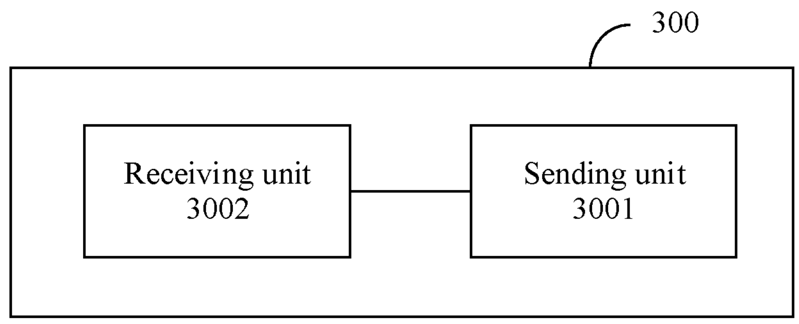
FIG. 9 is another schematic diagram of a structure of a data transmission apparatus according to an embodiment of this application.

FIG. 9 is a schematic composition diagram of a data transmission apparatus 300 according to an embodiment of this application. The data transmission apparatus 300 may be a chip or a system on a chip. The data transmission apparatus 300 may be configured to implement a function of the first node in the foregoing embodiments. In a possible implementation, the data transmission apparatus 300 includes a sending unit 3001 and a receiving unit 3002.

The sending unit 3001 is configured to send first configuration information to a second node, where the configuration information is used to configure a first time-frequency resource.

The sending unit 3001 is further configured to send second configuration information, where the second configuration information is used to indicate whether segmentation of a data packet on a first logical channel is allowed, the first logical channel corresponds to a second time-frequency resource, and the second time-frequency resource is included in the first time-frequency resource.

The receiving unit 3002 is configured to receive first data from the second node by using the first time-frequency resource.

Optionally, the first logical channel corresponds to a first data queue, and the data packet on the first logical channel includes a service data packet, or the data packet on the first logical channel includes control signaling.

Optionally, the first logical channel corresponds to a first protocol stack entity, and the data packet on the first logical channel is a service data unit SDU in the first protocol stack entity. Based on the foregoing design, the first information may be used to indicate whether segmentation of the service data unit in the first protocol stack entity is allowed.

It should be noted that all related content of the steps in the foregoing method embodiments may be cited in function description of corresponding function modules. Details are not described herein again. The data transmission apparatus 200 provided in this embodiment of this application is configured to implement the function of the first node in the foregoing data transmission method, to achieve a same effect as the foregoing data transmission method.

Figure 10:
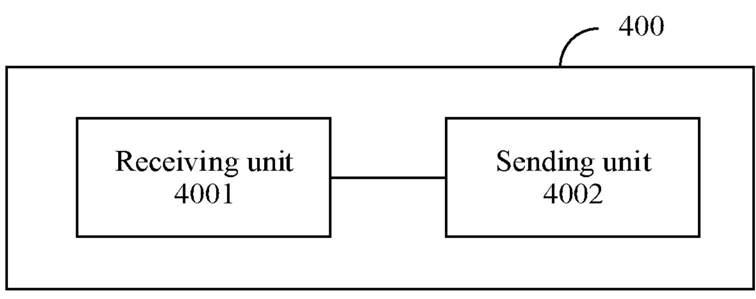
FIG. 10 is still another schematic diagram of a structure of a data transmission apparatus according to an embodiment of this application.

FIG. 10 is a schematic composition diagram of a data transmission apparatus 400 according to an embodiment of this application. The data transmission apparatus 400 may be a chip or a system on a chip. The data transmission apparatus 400 may be configured to implement a function of the second node in the foregoing embodiments. In a possible implementation, the data transmission apparatus 400 includes: a receiving unit 4001, configured to receive a first system broadcast message from a first node, where the first system broadcast message includes identity information of the first node; a sending unit 4002, configured to send an access request to the first node after determining that the identity information of the first node is consistent with preset identity information.

Optionally, the identity information of the first node may be at least one of a device identifier, a MAC address, a soft address, and a short address of the first node.

Figure 11:
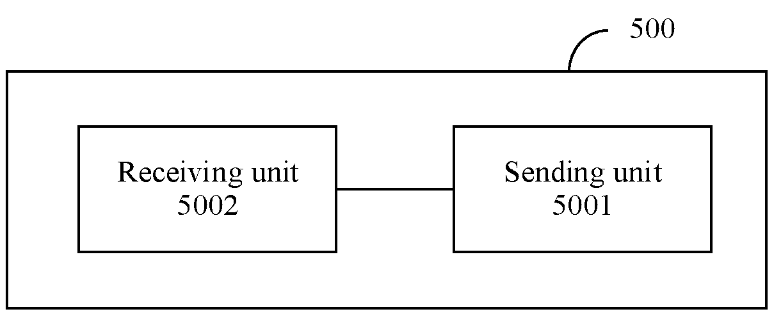
FIG. 11 is yet another schematic diagram of a structure of a data transmission apparatus according to an embodiment of this application.

FIG. 11 is a schematic composition diagram of a data transmission apparatus 500 according to an embodiment of this application. The data transmission apparatus 500 may be a chip or a system on a chip. The data transmission apparatus 500 may be configured to implement a function of the first node in the foregoing embodiments. In a possible implementation, the data transmission apparatus 500 includes: a sending unit 5001, configured to send a first system broadcast message to a second node, where the first system broadcast message includes identity information of a first node; and a receiving unit 5002, configured to receive an access request from the second node.

In a possible design, the identity information of the first node may be at least one of a device identifier, a MAC address, a soft address, and a short address of the first node.

Figure 12:
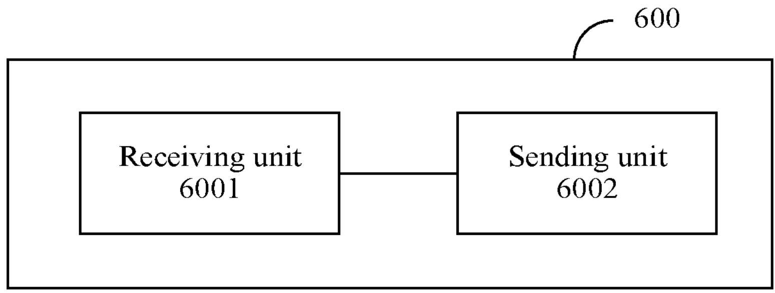
FIG. 12 is still yet another schematic diagram of a structure of a data transmission apparatus according to an embodiment of this application.

FIG. 12 is a schematic composition diagram of a data transmission apparatus 600 according to an embodiment of this application. The data transmission apparatus 600 may be a chip or a system on a chip. The data transmission apparatus 600 may be configured to implement a function of the second node in the foregoing embodiments. In a possible implementation, the data transmission apparatus 600 includes: a receiving unit 6001, configured to receive access resource configuration information from a first node, where the access resource configuration information is used to configure an access resource used to establish a connection (also referred to as access) to the first node; and a sending unit 6002, configured to send, by a second node, an access request to the first node on the configured access resource.

In a possible design, the access resource configuration information further includes information about an access manner corresponding to the access resource, or the access resource configuration information is further used to indicate an access manner corresponding to the access resource.

In a possible design, the access resource configuration information may be system information or RRC signaling.

In a possible design, the sending unit 6002 is specifically configured to randomly select a first resource from the access resource, and send the access request to the first node on the first resource.

In a possible design, the sending unit 6002 is specifically configured to send the access request to the first node, and send second identity information of the second node to the first node on the first resource.

In a possible design, the sending unit 6002 is specifically configured to: determine a second resource from the access resource based on the second identity information of the second node, and send the access request to the first node on the second resource.

In a possible design, the sending unit 6002 is specifically configured to send third identity information of the second node to the first node on the second resource.

In a possible design, the second identity information and the third identity information may be the same or different. The second identity information or the third identity information may be at least one of a device identifier, a MAC address, a soft address, and a short address.

Figure 13:
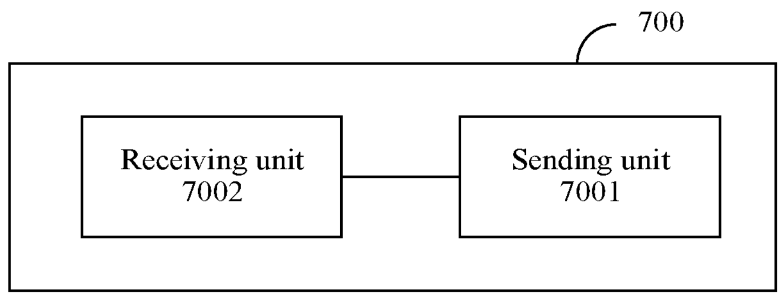
FIG. 13 is a further schematic diagram of a structure of a data transmission apparatus according to an embodiment of this application.

FIG. 13 is a schematic composition diagram of a data transmission apparatus 700 according to an embodiment of this application. The data transmission apparatus 700 may be a chip or a system on a chip. The data transmission apparatus 700 may be configured to implement a function of the first node in the foregoing embodiments. In a possible implementation, the data transmission apparatus 700 includes: a sending unit 7001, configured to send access resource configuration information to a second node, where the access resource configuration information is used to configure an access resource used to establish a connection (also referred to as access) to a first node; and a receiving unit 7002, configured to receive, by the first node, an access request from the second node by using the access resource.

In a possible design, the access resource configuration information further includes information about an access manner corresponding to the access resource, or the access resource configuration information is further used to indicate an access manner corresponding to the access resource.

In a possible design, the access resource configuration information may be system information or RRC signaling.

Figure 14:
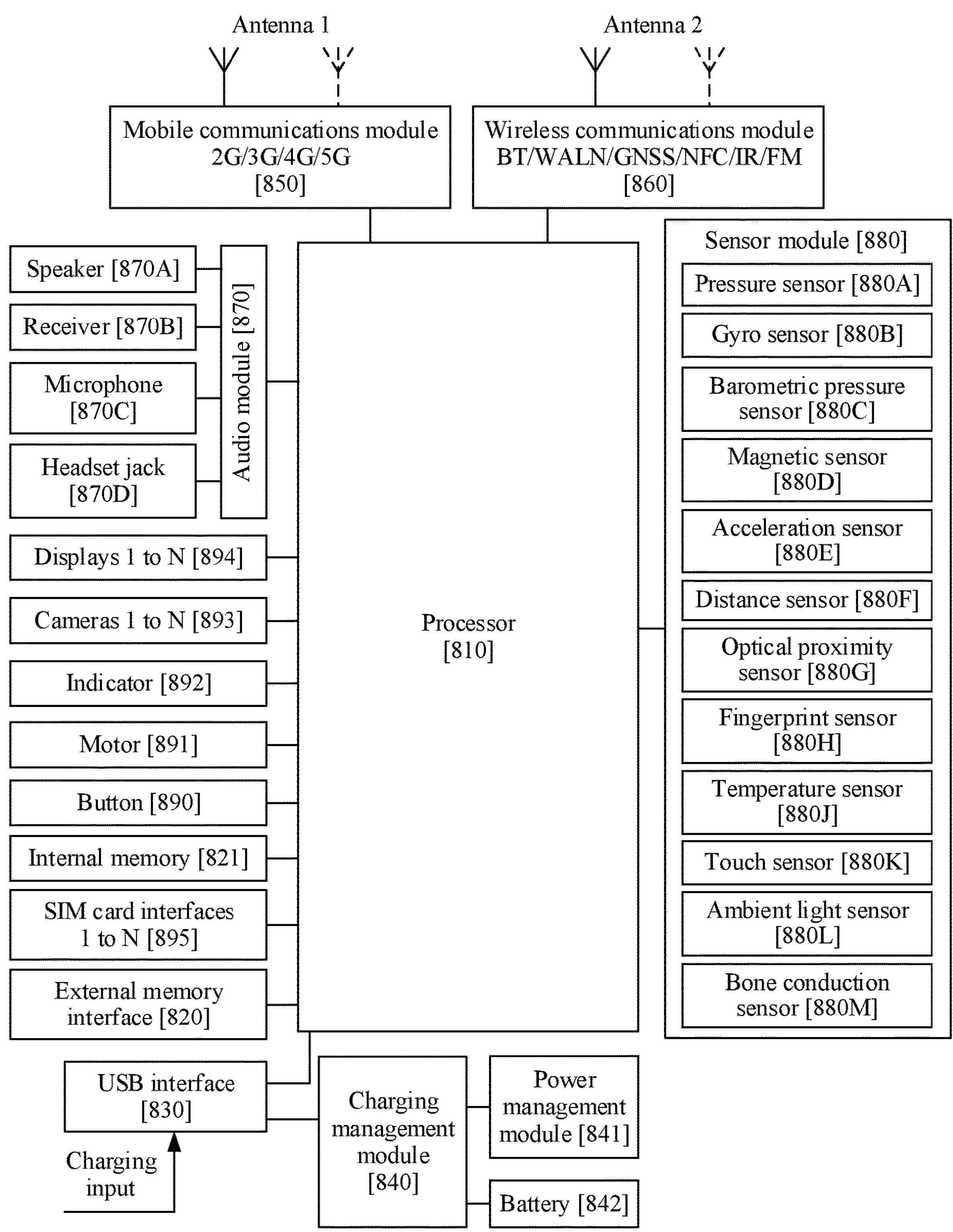
FIG. 14 is a still further schematic diagram of a structure of a data transmission apparatus according to an embodiment of this application.

FIG. 14 is a schematic composition diagram of a data transmission apparatus 800 according to an embodiment of this application. The data transmission apparatus may be configured to implement a function of the first node or the second node in the foregoing data transmission method or communication method. The data transmission apparatus 800 may include at least one of a processor 810, an external memory interface 820, an internal memory 821, a universal serial bus (USB) interface 830, a charging management module 840, a power management module 841, a battery 842, an antenna 1, an antenna 2, a mobile communications module 850, a wireless communications module 860, an audio module 870, a speaker 870A, a receiver 870B, a microphone 870C, a headset jack 870D, a sensor module 880, a button 890, a motor 891, an indicator 892, a camera 893, a display 894, a subscriber identification module (SIM) card interface 895, and the like.

It may be understood that the structure shown in this embodiment of this application does not constitute a specific limitation on the data transmission apparatus 800. In some other embodiments of this application, the data transmission apparatus 800 may include more or fewer components than those shown in the figure, some components may be combined, or some components may be split, or there may be a different component layout. The components shown in the figure may be implemented by hardware, software, or a combination of software and hardware.

The processor 810 may include one or more processing units. For example, the processor 810 may include an application processor (AP), a modem processor, a graphics processing unit (GPU), an image signal processor (ISP), a controller, a video codec, a digital signal processor (DSP), an application-specific integrated circuit (ASIC), a field-programmable gate array (FPGA), a baseband processor, and/or a neural-network processing unit (NPU). Different processing units may be independent components, or may be integrated into one or more processors. In some embodiments, the data transmission apparatus 800 may alternatively include one or more processors 810. The controller may generate an operation control signal based on instruction operation code and a time sequence signal, to complete control of instruction reading and instruction execution. In some other embodiments, a memory may be disposed in the processor 810, to store an instruction and data. For example, the memory in the processor 810 may be a cache. The memory may store an instruction or data just used or cyclically used by the processor 810. If the processor 810 needs to use the instruction or the data again, the processor may directly invoke the instruction or the data from the memory. In this way, repeated access is avoided, waiting time of the processor 810 is reduced, and efficiency of processing data or executing the instruction by the data transmission apparatus 800 is improved.

In some embodiments, the processor 810 may include one or more interfaces. The interface may include an inter-integrated circuit (I2C) interface, an inter-integrated circuit sound (I2S) interface, a pulse code modulation (pulse code modulation, PCM) interface, a universal asynchronous receiver/transmitter (UART) interface, a mobile industry processor interface (MIPI), a general-purpose input/output (GPIO) interface, a SIM card interface, a USB interface, and/or the like. The USB interface 830 is an interface that conforms to a USB standard specification, and may be specifically a mini USB interface, a micro USB interface, a USB type-C interface, or the like. The USB interface 830 may be configured to connect to a charger to charge the data transmission apparatus 800, or may be configured to transmit data between the data transmission apparatus 800 and a peripheral device. The USB interface 830 may alternatively be configured to connect to a headset, to play audio by using the headset.

It may be understood that an interface connection relationship between the modules illustrated in this embodiment of this application is merely an example for description, and does not constitute a limitation on the structure of the data transmission apparatus 800. In some other embodiments of this application, the data transmission apparatus 800 may alternatively use an interface connection manner different from an interface connection manner in the foregoing embodiment, or a combination of a plurality of interface connection manners.

The charging management module 840 is configured to receive a charging input from a charger. The charger may be a wireless charger or a wired charger. In some embodiments of wired charging, the charging management module 840 may receive a charging input of a wired charger through the USB interface 830. In some embodiments of wireless charging, the charging management module 840 may receive a wireless charging input through a wireless charging coil of the data transmission apparatus 800. The charging management module 840 supplies power to a device by using the power management module 841 while charging the battery 842.

The power management module 841 is configured to connect to the battery 842, the charging management module 840, and the processor 810. The power management module 841 receives an input from the battery 842 and/or the charging management module 840, and supplies power to the processor 810, the internal memory 821, an external memory, the display 894, the camera 893, the wireless communications module 860, and the like. The power management module 841 may be further configured to monitor parameters such as a battery capacity, a battery cycle count, and a battery health status (electric leakage or impedance). In some other embodiments, the power management module 841 may alternatively be disposed in the processor 810. In some other embodiments, the power management module 841 and the charging management module 840 may alternatively be disposed in a same device.

A wireless communication function of the data transmission apparatus 800 may be implemented by using the antenna 1, the antenna 2, the mobile communications module 850, the wireless communications module 860, the modem processor, the baseband processor, and the like.

The antenna 1 and the antenna 2 are configured to transmit and receive an electromagnetic wave signal. Each antenna in the data transmission apparatus 800 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 850 may provide a solution that is applied to the data transmission apparatus 800 and that includes wireless communications such as 2G, 3G, 4G, and 5G. The mobile communications module 850 may include at least one filter, a switch, a power amplifier, a low noise amplifier (LNA), and the like. The mobile communications module 850 may receive an electromagnetic wave through the antenna 1, perform processing such as filtering or amplification on the received electromagnetic wave, and transmit a processed electromagnetic wave to the modem processor for demodulation. The mobile communications module 850 may further amplify a signal modulated by the modem processor, and convert an amplified signal into an electromagnetic wave for radiation through the antenna 1. In some embodiments, at least some function modules of the mobile communications module 850 may be disposed in the processor 810. In some embodiments, at least some function modules of the mobile communications module 850 may be disposed in a same device as at least some modules of the processor 810.

The wireless communications module 860 may provide a solution that is applied to the data transmission apparatus 800 and that includes wireless communications such as a wireless local area network (WLAN) (for example, a Wi-Fi) network), Bluetooth (BT), a global navigation satellite system (GNSS), frequency modulation (FM), near field communication (NFC), an infrared (IR) technology, or another possible general-purpose transmission technology.

Optionally, the wireless communications module 860 may be one or more components that integrate at least one communication processing module. One communication processing module may correspond to one network interface. The network interface may be set to different service function modes. In different modes, the network interface may establish network connections corresponding to the modes.

For example, a network connection supporting a P2P function may be established by using a network interface in a P2P function mode. A network connection supporting a STA function may be established by using a network interface in a STA function mode. A network connection supporting an AP function may be established by using a network interface in an AP mode.

The wireless communications module 860 receives an electromagnetic wave through the antenna 2, performs frequency modulation and filtering processing on an electromagnetic wave signal, and sends a processed signal to the processor 810. The wireless communications module 860 may further receive a to-be-sent signal from the processor 810, perform frequency modulation and amplification on the signal, and convert the signal into an electromagnetic wave for radiation through the antenna 2.

The data transmission apparatus 800 implements a display function by using the GPU, the display 894, the application processor, and the like. The GPU is a microprocessor for image processing, and is connected to the display 894 and the application processor. The GPU is configured to perform mathematical and geometrical calculation, and is configured to render an image. The processor 810 may include one or more GPUs that execute program instructions to generate or change display information.

The display 894 is configured to display an image, a video, and the like. The display 894 includes a display panel. The display panel may use a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), and the like. In some embodiments, the data transmission apparatus 800 may include one or more displays 894.

In some embodiments of this application, when the display panel is made of a material such as an OLED, an AMOLED, or an FLED, the display 894 in FIG. 14 may be folded. Herein, that the display 894 may be folded means that the display may be folded to any angle at any part and may be maintained at the angle. For example, the display 894 may be folded left and right in the middle, or may be folded up and down in the middle. In this application, the display that can be folded is referred to as a foldable display. The touch display may be a screen, or may be a display formed by combining a plurality of screens. This is not limited herein.

The display 894 of the data transmission apparatus 800 may be a flexible screen. Currently, the flexible screen attracts much attention because of unique features and huge potential of the flexible screen. Compared with a conventional screen, the flexible screen has features of strong flexibility and bendability, and can provide a user with a new bendability-based interaction mode, to satisfy more requirements of the user on a terminal. For a data transmission apparatus configured with a foldable display, the foldable display on the data transmission apparatus may be switched between a small screen in a folded form and a large screen in an expanded form at any time. Therefore, the user uses a multi-screen display function more frequently on the data transmission apparatus configured with the foldable display.

The data transmission apparatus 800 may implement a photographing function by using the ISP, the camera 893, the video codec, the GPU, the display 894, the application processor, and the like.

The ISP is configured to process data fed back by the camera 893. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 893.

The camera 893 is configured to capture a static image or a video. An optical image of an object is generated through the lens, and is projected onto the photosensitive element. The photosensitive element may be a charge-coupled device (CCD) or a complementary metal-oxide-semiconductor (CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV In some embodiments, the data transmission apparatus 800 may include one or more cameras 893.

The digital signal processor is configured to process a digital signal, and may process another digital signal in addition to a digital image signal. For example, when the data transmission apparatus 800 selects a frequency, the digital signal processor is configured to perform Fourier transformation on frequency energy.

The video codec is configured to compress or decompress a digital video. The data transmission apparatus 800 may support one or more video codecs. In this way, the data transmission apparatus 800 may play or record videos in a plurality of coding formats, for example, Moving Picture Experts Group (MPEG)-1, MPEG-2, MPEG-3, and MPEG-4.

The NPU is a neural-network (NN) computing processor. The NPU quickly processes input information based on a structure of a biological neural network, for example, a function of transferring a service between human brain neurons, and may further continuously perform self-learning. Applications such as intelligent cognition of the data transmission apparatus 800, for example, image recognition, facial recognition, speech recognition, and text understanding, may be implemented by using the NPU.

The external memory interface 820 may be configured to connect to an external storage card, for example, a micro SD card, to extend a storage capability of the data transmission apparatus 800. The external storage card communicates with the processor 810 through the external memory interface 820, to implement a data storage function. For example, files such as music and a video are stored in the external storage card.

The internal memory 821 may be configured to store one or more computer programs, and the one or more computer programs include an instruction. The processor 810 may run the instruction stored in the internal memory 821, so that the data transmission apparatus 800 performs the data transmission method and the communication method, various types of application and data processing, and the like provided in some embodiments of this application. The internal memory 821 may include a program storage area and a data storage area.

The program storage area may store an operating system. The program storage area may further store one or more applications (for example, Gallery and Contacts), and the like. The data storage area may store data (for example, Photos and Contacts) created during use of the data transmission apparatus 800, and the like. In addition, the internal memory 821 may include a high-speed random access memory, or may include a non-volatile memory, for example, one or more magnetic disk storage devices, a flash memory, or a universal flash storage (universal flash storage, UFS). In some embodiments, the processor 810 may run the instruction stored in the internal memory 821 and/or the instruction stored in the memory that is disposed in the processor 810, to enable the data transmission apparatus 800 to perform the data transmission method and the communication method, and other application and data processing provided in embodiments of this application. The data transmission apparatus 800 can implement an audio function such as music playing or recording by using the audio module 870, the speaker 870A, the receiver 870B, the microphone 870C, the headset jack 870D, the application processor, and the like.

The sensor module 880 may include a pressure sensor 880A, a gyro sensor 880B, a barometric pressure sensor 880C, a magnetic sensor 880D, an acceleration sensor 880E, a distance sensor 880F, an optical proximity sensor 880G, a fingerprint sensor 880H, a temperature sensor 880J, a touch sensor 880K, an ambient light sensor 880L, a bone conduction sensor 880M, and the like.

An embodiment further provides a computer storage medium. The computer storage medium stores computer instructions. When the computer instructions are run on a data transmission apparatus, the data transmission apparatus is enabled to perform the foregoing related method steps, to implement the data transmission method in the foregoing embodiments.

An embodiment further provides a computer program product. When the computer program product runs on a computer, the computer performs the foregoing related steps, to implement the data transmission method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the data transmission method in the foregoing method embodiments.

Figure 15:
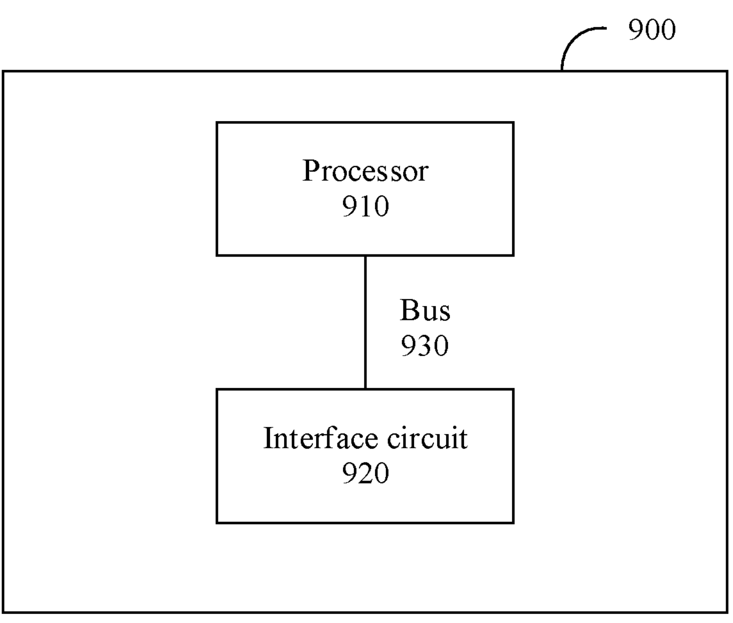
FIG. 15 is a schematic diagram of a structure of a chip according to an embodiment of this application.

FIG. 15 is a schematic diagram of a structure of a chip 900. The data transmission apparatus in this application may be the chip 900. The chip 900 includes one or more processors 910 and an interface circuit 920. Optionally, the chip 900 may further include a bus 930.

The processor 910 may be an integrated circuit chip with a signal processing capability. In an implementation process, the steps in the foregoing methods 200 may be completed by using an integrated logic circuit of hardware in the processor 910 or an instruction in a form of software.

Optionally, the processor 910 may be a general-purpose processor, a DSP, an ASIC, an FPGA or another programmable logic device, a discrete gate or transistor logic device, or a discrete hardware component. The processor may implement or perform the methods and the steps that are disclosed in embodiments of this application. The general-purpose processor may be a microprocessor, and the processor may be alternatively any conventional processor or the like.

The interface circuit 920 may be used to communicate with another apparatus. The interface circuit 920 may be used to send or receive data, instructions, or information. The processor 910 may process data, instructions, or other information received through the interface circuit 920, and send, through the interface circuit 920, information obtained after processing.

For example, when the chip 900 is configured to implement a function of the first node in the foregoing methods, another of the foregoing apparatuses may be the second node or an apparatus in the second node (for example, a data transmission apparatus in the second node) in the foregoing embodiments.

For another example, when the chip 900 is configured to implement a function of the second node in the foregoing methods, another of the foregoing apparatuses may be the first node or an apparatus in the first node (for example, a data transmission apparatus in the first node) in the foregoing embodiments.

Optionally, the chip further includes a memory. The memory may include a read-only memory and a random access memory, and provide operation instructions and data for the processor. A part of the memory may further include a non-volatile random access memory (NVRAM).

Optionally, the memory stores an executable software module or a data structure, and the processor may perform a corresponding operation by invoking an operation instruction (the operation instruction may be stored in an operating system) stored in the memory.

Optionally, the chip may be used in a first control apparatus, a second control apparatus, or a terminal device in embodiments of this application. Optionally, the interface circuit 920 may be used to output an execution result of the processor 910. For the data transmission method provided in one or more embodiments of this application, refer to the foregoing embodiments. Details are not described herein again.

It should be noted that functions corresponding to each of the processor 910 and the interface circuit 920 may be implemented by using a hardware design, may be implemented by using a software design, or may be implemented by combining software and hardware. This is not limited herein.

The data transmission apparatus, the computer storage medium, the computer program product, and the chip provided in embodiments each are configured to perform the corresponding method provided above. Therefore, for beneficial effects that can be achieved by the data transmission apparatus, the computer storage medium, the computer program product, and the chip, refer to the beneficial effects in the corresponding method provided above. Details are not described herein again.

An embodiment further provides a cockpit system. The cockpit system includes the foregoing data transmission apparatus 300, data transmission apparatus 500, data transmission apparatus 700, or data transmission apparatus 900.

An embodiment further provides a terminal. The terminal may be a means of transportation or an intelligent device, including a smart home device, an intelligent wearing device, an uncrewed aerial vehicle, an uncrewed carrier vehicle, an automobile, a robot, or the like. The terminal includes any one of the data transmission apparatus 200, the data transmission apparatus 300, the data transmission apparatus 400, the data transmission apparatus 500, the data transmission apparatus 600, the data transmission apparatus 700, the data transmission apparatus 800, or the data transmission apparatus 900. In an implementation, the terminal includes the foregoing cockpit system.

An embodiment further provides a vehicle. The vehicle includes a data transmission apparatus, and the data processing apparatus is configured to implement a function of the first node in the foregoing data transmission method or communication method. For example, the vehicle may include any one of the data transmission apparatus 300, the data transmission apparatus 500, the data transmission apparatus 700, or the data transmission apparatus 900.

It should be understood that sequence numbers of the foregoing processes do not mean execution sequences in various embodiments of this application. The execution sequences of the processes should be determined based on functions and internal logic of the processes, and should not be construed as any limitation on implementation processes in embodiments of this application.

A person of ordinary skill in the art may be aware that units and algorithm steps in the examples described with reference to embodiments disclosed in this specification can be implemented by electronic hardware or a combination of computer software and electronic hardware. Whether the functions are implemented by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed system, apparatus, and method may be implemented in other manners. For example, the foregoing described apparatus embodiments are merely examples. For example, division of the units is merely a logical function division and may be another division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on this understanding, the technical solutions of this application essentially, or a part contributing to the conventional technology, or some of the technical solutions may be implemented in a form of a software product. The computer software product is stored in a storage medium, and includes a plurality of instructions for instructing a computer device (which may be, for example, a personal computer, a server, or a network device) to perform all or some of the steps of the methods described in embodiments of this application. The foregoing storage medium includes any medium that can store program code, such as a USB flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:

receiving, from a first node, first configuration information indicating at least one of a time domain resource of a first time-frequency resource or a frequency domain resource of the first time-frequency resource;

obtaining first information corresponding to a first logical channel, wherein the first information indicates whether segmentation of a data packet on the first logical channel is allowed, wherein the first logical channel corresponds to a second time-frequency resource, and wherein the second time-frequency resource is comprised in the first time-frequency resource;

sending first data to the first node using the first time-frequency resource, wherein the first data comprises the data packet on the first logical channel when the first information indicates that segmentation is allowed and/or a size of the second time-frequency resource is sufficient to carry the data packet on the first logical channel; and determining not to send the first data on the first logical channel using the second time-frequency resource when the first information indicates that segmentation is not allowed and the size of the second time-frequency resource is insufficient to carry the data packet on the first logical channel.

2. The data transmission method of claim 1, wherein the first time-frequency resource is a semi-persistent resource.

3. The data transmission method of claim 1, wherein the first logical channel corresponds to a first data queue, and wherein the data packet comprises either a service data packet or control signaling.

4. The data transmission method of claim 1, wherein the first logical channel corresponds to a first protocol stack entity, and wherein the data packet is a service data unit (SDU) in the first protocol stack entity.

5. The data transmission method of claim 1, wherein obtaining the first information comprises receiving, from the first node, second configuration information for configuring the first information.

6. The data transmission method of claim 1, wherein obtaining the first information comprises determining, based on quality of service (QoS) information or a service type corresponding to data on the first logical channel, the first information.

7. The data transmission method of claim 1, wherein the first data comprises at least one data packet on a second logical channel.

8. A data transmission method, comprising:

sending, to a second node, first configuration information indicating at least one of a time domain resource of a first time-frequency resource or a frequency domain resource of the first time-frequency resource;

sending, to the second node, second configuration information indicating whether segmentation of a data packet on a first logical channel is allowed, wherein the first logical channel corresponds to a second time-frequency resource, and wherein the second time-frequency resource is comprised in the first time-frequency resource;

receiving first data from the second node using the first time-frequency resource, wherein the first data comprises the data packet on the first logical channel when the second configuration information indicates that segmentation is allowed and/or a size of the second time-frequency resource is sufficient to carry the data packet on the first logical channel; and determining not to receive the first data on the first logical channel using the second time-frequency resource when the first information indicates that segmentation is not allowed and the size of the second time-frequency resource is insufficient to carry the data packet on the first logical channel.

9. The data transmission method of claim 8, wherein the first time-frequency resource is a semi-persistent resource.

10. The data transmission method of claim 8, wherein the first logical channel corresponds to a first data queue, and wherein the data packet comprises either a service data packet or control signaling.

11. The data transmission method of claim 8, wherein the first logical channel corresponds to a first protocol stack entity, and wherein the data packet is a service data unit (SDU) in the first protocol stack entity.

12. A data transmission apparatus, comprising:

a memory configured to store instructions; and one or more processors coupled to the memory and configured to execute the instructions to cause the data transmission apparatus to:

receive, from a first node, first configuration information indicating at least one of a time domain resource of a first time-frequency resource or a frequency domain resource of the first time-frequency resource;

obtain first information corresponding to a first logical channel, wherein the first information indicates whether segmentation of a data packet on the first logical channel is allowed, wherein the first logical channel corresponds to a second time-frequency resource, and wherein the second time-frequency resource is comprised in the first time-frequency resource;

send first data to the first node using the first time-frequency resource, wherein the first data comprises the data packet on the first logical channel when the first information indicates that segmentation is allowed and/or a size of the second time-frequency resource is sufficient to carry the data packet on the first logical channel; and determine not to send the first data on the first logical channel using the second time-frequency resource when the first information indicates that segmentation is not allowed and the size of the second time-frequency resource is insufficient to carry the data packet on the first logical channel.

13. The data transmission apparatus of claim 12, wherein the first time-frequency resource is a semi-persistent resource.

14. The data transmission apparatus of claim 12, wherein the first data excludes the data packet on the first logical channel when the first information indicates that segmentation is not allowed and the size of the second time-frequency resource is insufficient to carry the data packet on the first logical channel.

15. The data transmission apparatus of claim 12, wherein the first logical channel corresponds to a first protocol stack entity, and wherein the data packet is a service data unit (SDU) in the first protocol stack entity.

16. The data transmission apparatus of claim 12, wherein the one or more processors are further configured to execute the instructions to cause the data transmission apparatus to receive, from the first node, second configuration information for configuring the first information.

17. A data transmission apparatus, comprising:

a memory configured to store instructions; and one or more processors coupled to the memory and configured to execute the instructions to cause the data transmission apparatus to:

send, to a second node, first configuration information for configuring a first time-frequency resource;

send, to the second node, second configuration information indicating whether segmentation of a data packet on a first logical channel is allowed, wherein the first logical channel corresponds to a second time-frequency resource, and wherein the second time-frequency resource is comprised in the first time-frequency resource;

receive first data from the second node using the first time-frequency resource, wherein the first data comprises the data packet on the first logical channel when the second configuration information indicates that segmentation is allowed and/or a size of the second time-frequency resource is sufficient to carry the data packet on the first logical channel; and determine not to receive the first data on the first logical channel using the second time-frequency resource wherein the first data excludes the data packet on the first logical channel when the first information indicates that segmentation is not allowed and the size of the second time-frequency resource is insufficient to carry the data packet on the first logical channel.

18. The data transmission apparatus of claim 17, wherein the first time-frequency resource is a semi-persistent resource.

19. The data transmission apparatus of claim 17, wherein the first logical channel corresponds to a first protocol stack entity, and wherein the data packet is a service data unit (SDU) in the first protocol stack entity.

20. The data transmission apparatus of claim 17, wherein the first data comprises at least one data packet on a second logical channel.

* * * * *